United States Patent [19]
Thier et al.

[11] Patent Number: 5,410,644
[45] Date of Patent: Apr. 25, 1995

[54] 3D VIDEO SPECIAL EFFECTS SYSTEM

[75] Inventors: Uri Thier, West Hartford; Gene Sarra, New Britain, both of Conn.; William Woodbury; James Norman, both of Gainesville, Fla.

[73] Assignee: New Microtime Inc., Bloomfield, Conn.

[21] Appl. No.: 299,327

[22] Filed: Aug. 31, 1994

Related U.S. Application Data

[63] Continuation of Ser. No. 114,600, Aug. 31, 1993, abandoned, which is a continuation of Ser. No. 972,869, Nov. 5, 1992, abandoned, which is a continuation of Ser. No. 501,021, Mar. 29, 1990, abandoned.

[51] Int. Cl.⁶ ............................................. G06T 15/00
[52] U.S. Cl. ...................................... 395/125; 395/163
[58] Field of Search ................. 364/521, 522; 340/729; 395/125, 163; 348/580; 345/139

[56] References Cited

U.S. PATENT DOCUMENTS

| | | | |
|---|---|---|---|
| 1,563,703 | 1/1986 | Taylor et al. | 358/160 |
| 1,665,433 | 5/1987 | Hinson et al. | 358/22 |
| 4,677,576 | 6/1987 | Berlin, Jr. et al. | 364/522 |
| 4,757,384 | 7/1988 | Nonweiler et al. | 388/160 |
| 4,777,598 | 10/1988 | Kellar et al. | 364/413.22 |
| 4,812,988 | 3/1989 | Duthuit et al. | 395/125 |
| 4,845,643 | 7/1989 | Clapp | 364/522 X |
| 4,860,217 | 8/1989 | Sasaki et al. | 364/522 X |
| 4,888,713 | 12/1989 | Falk | 364/522 |
| 4,953,107 | 8/1990 | Hedley et al. | 395/125 X |
| 4,974,177 | 11/1990 | Nishiguchi | 395/125 |
| 5,107,444 | 4/1992 | Wu | 395/125 X |

FOREIGN PATENT DOCUMENTS

| | | |
|---|---|---|
| 0186206 | 7/1986 | European Pat. Off. . |
| 0248626 | 12/1987 | European Pat. Off. . |
| 0280316 | 8/1988 | European Pat. Off. . |
| 0283159 | 9/1988 | European Pat. Off. . |
| 0320166 | 6/1989 | European Pat. Off. . |
| 0360576 | 3/1990 | European Pat. Off. . |
| 0399663 | 11/1990 | European Pat. Off. . |

OTHER PUBLICATIONS

Vigneaux et al., SMPTE Journal, Mar. 1991, vol. 100, No. 3, pp. 162–166, "A Real–Time Video Mapping and Manipulation System".

Ruelberg, Signal Processing of HDTV, II, Proceedings of the Third International Workshop on HDTV, pp. 831–839, 30th Aug.–1st Sep., 1989, "Geometric Processing of High Definition Television Images".

Primary Examiner—Mark K. Zimmerman
Attorney, Agent, or Firm—Cesari and McKenna

[57] ABSTRACT

Real-time video information is digitized and stored as a plurality of digital pixels in a memory. A 3D surface is then constructed from a flat source surface by breaking the surface into a plurality of flat polygonal patches and folding, rotating and manipulating the patches in three dimensions. The constructed object can then be manipulated as an object in three dimensions. During patch and object manipulation, the special effects system keeps track of the patch vertex locations. After the object has been created and located, real-time video is painted on the object surface by using the patch vertex locations to retrieve selected source pixels from the memory and to construct a value for each pixel on the object surface from the selected source pixels.

12 Claims, 21 Drawing Sheets

STEP 1: DESIGNATE PATCHES

STEP 2: REDUCE SIZE; ROTATE

STEP 3: FOLD UP

STEP 4: RECTANGULAR TUBE (SHEET 1 OF 2)

| VIDEO FIELDS | N | N+1 | N+2 | N+3 | N+4 | N+5 | N+6 |
|---|---|---|---|---|---|---|---|
| SYSTEM COMPUTER | | | | | | | |
| a) COMPUTE AND STORE PARAMETERS FOR ONE VIDEO FIELD. | PIX A | PIX B | PIX C | PIX D | PIX E | PIX F | PIX G |
| b) SEND INPUT VIDEO SOURCE-TO-PATCH ASSIGNMENT DATA TO INPUT VIDEO PROCESSOR. | | PIX A | PIX B | PIX C | PIX D | PIX E | PIX F |
| c) SEND LINE COEFFICIENTS, PATCH NUMBERS, ORIENTATIONS, PRIORITIES, OUTPUT VIDEO SOURCE SWITCHING, TO PATCH DETECTOR. | | | PIX A | PIX B | PIX C | PIX D | PIX E |
| d) SEND TARGET-TO-SOURCE COEFFICIENTS AND PATCH NUMBERS TO MANIPULATOR | | | PIX A | PIX B | PIX C | PIX D | PIX E |
| INPUT VIDEO PROCESSOR SEND INPUT VIDEO TO FIELD BUFFER MEMORY. | | | PIX A | PIX B | PIX C | PIX D | PIX E |
| VIDEO FIELD BUFFER MEMORY | | | | | | | |
| a) WRITE VIDEO. | | | PIX A | PIX B | PIX C | PIX D | PIX E |
| b) READ VIDEO. | | | | PIX A | PIX B | PIX C | PIX D |
| PATCH DETECTOR | | | | | | | |
| a) SEND PATCH NUMBER TO MANIPULATOR. | | | | PIX A | PIX B | PIX C | PIX D |
| b) SEND KEYSTART AND VIDEO SWITCHING INFO TO OUTPUT VIDEO PROCESSOR. | | | | PIX A | PIX B | PIX C | PIX D |
| MANIPULATOR COMPUTE FIELD MEMORY READ ADDRESSES | | | | PIX A | PIX B | PIX C | PIX D |
| CALCODE COMPUTE FILTER CODES. | | | | PIX A | PIX B | PIX C | PIX D |
| OUTPUT VIDEO PROCESSOR | | | | | | | |
| a) SWITCH DATA SOURCES. | | | | PIX A | PIX B | PIX C | PIX D |
| b) INTERPOLATE KEY. | | | | PIX A | PIX B | PIX C | PIX D |

DATA FROM SYSTEM COMPUTER HELD FOR ONE FIELD BEFORE IMPLEMENTATION.

*FIG. 17*

3D VIDEO SPECIAL EFFECTS SYSTEM

This is a continuation of U.S. patent application Ser. No. 08/114,600, filed Aug. 31, 1993, and now abandoned, which is a continuation of U.S. patent application Ser. No. 07/972,869, filed Nov. 5, 1992, and now abandoned, which is a continuation of U.S. patent application Ser. No. 07/501,021, filed Mar. 29, 1990, and now abandoned, for a 3D Video Special Effects System.

FIELD OF THE INVENTION

This invention relates to a video special effects system and, more particularly, to a video special effects system which is capable of displaying real-time 3D video images, such as television images, that have been transformed in three dimensions, including perspective.

BACKGROUND OF THE INVENTION

Video special effect systems for spatially transforming two-dimensional real-time or "live" television video images are well-known. These systems are capable of generating two-dimensional video images which can be displayed and transformed in a variety of ways including rotation, translation and perspective manipulation.

A typical television special effects processor operates by first digitizing a normal analog television signal to generate a plurality of digital pixels which represent the digitized picture. The pixels for each television frame are then stored as "source" pixels in a field memory. The source pixels stored in the memory are sequentially used to generate output pixels in each scan line in the output picture. More specifically, a control circuit which has been programmed with the desired mathematical image transformation equations repetitively fetches source pixels from the memory. The source pixels are fetched from memory locations which will generate the next pixel on the output scan line. Using the image transformation equations, a transformation circuit computes the pixel value of the next pixel in order to generate an output transformed video signal. With specialized hardware, the entire process of storing and computing the transformed video information can be repeated at a rate sufficient so that the output video image changes at a television processing rate and produces "live" transformed television images. An example of such a system is shown in U.S. Pat. No. 4,631,750 entitled "Method and System for Spatially Transforming Images" issued on Dec. 23, 1986.

While the aforementioned two-dimensional system is capable of generating a variety of digital special effects at a real-time video rate and of simulating certain three-dimensional effects, it does not have true three-dimensional capability. For example, it is not possible with such a system to rotate a three-dimensional object with real-time video displayed as the object rotates.

True three-dimensional objects and effects have been achieved in computer graphics systems. Although there are many methods of representing three-dimensional shapes that are well-known in the computer graphics area, a typical method of constructing a 3D shape is to approximate the shape by using geometrical surfaces. From the surfaces, mathematical equations are derived which represent the overall shape. These equations can then be transformed by transformation matrices which control how each surface of the shape moves when the constructed object is rotated, translated or scaled.

Generally, the prior art area shape construction or modeling is quite broad. However, two commonly used methods to represent three-dimensional surfaces are polygon meshes and parametric bicubic patches. A polygon mesh is generally considered to be a set of connected polygonal planar surfaces. Such meshes can be used to represent flat or curved surfaces. However, with curved surfaces, the representation is only approximate. Parametric bicubic patches are more suited for curved surfaces and can represent points on a curved surface by using three equations, one for each of the x, y and z axis directions. Each equation has two variables in terms for all powers of the parameters up to their cubic value. The boundaries of each patch are, therefore, parametric cubic curves. Many fewer bicubic patches than polygonal patches are needed to represent a curved surface to a given accuracy, but the mathematical algorithms required to work with the bicubic mathematics are considerably more complex than those necessary to work with planar polygons.

With either polygons or bicubic patches, a 3D shape is constructed by modeling the outer shape surface by means of plurality of polygons, which consist of straight-line edges, or a plurality of three-dimensional curves. Initially, the entire surface is modeled as a plurality of connected lines which represent the polygon edges or the parametric curves. The resulting model is called a line or "wireframe" model and appears as a transparent object so that the portions of the surface which lie at the back of the object as well as portions of the surface which lie at the front can be seen.

In order to make the model appear more "life-like", a viewing point is assigned and various algorithms are then used to remove "hidden" lines which represent surfaces that lie at the "back" of the model and would be obscured by surfaces which lie at the front.

Finally, in order to generate an even more lifelike shape, each of the polygonal or bicubic patches is filled in with an image or shaded with various shadings or colors. Once a three-dimensional surface has been constructed in accordance with the conventional methods and equations, it can then be subjected to transformations which involve rotation, perspective representations, translations or scaling. Normally, a transformation is performed by applying well-known transformation equations to selected points of the modeled shape called "source" points to generate "target" points which represent the source points of the shape which have been transformed to new locations.

For simple shaded surfaces, it is generally not necessary to transform each point of the surface in order to generate the transformed shape. For example, for polygonal mesh surfaces, it may be sufficient to transform the vertices of each polygon and then recalculate the shading of each surface to represent the transformed image. However, when the surfaces of the transformed model involve a pattern or image painted on each surface, then it is generally necessary to transform each single point of the graphics image to produce the transformed image as is done with the two-dimensional video special effects systems mentioned above.

The algorithms and methods for generating and transforming various 3D shapes are well-known in the art and there are many alternative choices which generate "life-like" models. Examples of conventional equations and methods can be found in various texts on computer graphics, for example, *"Fundamentals of Interactive Computer Graphics"* by J. D. Foley and A. Van Dam, Addison-Wesley Publishing Company, Reading, Mass., July 1984; or *"Principles of Interactive Computer Graphics"* by William M. Newman and Robert F. Sproull, McGraw-Hill Book Company, Second Edition, 1979.

In those cases in which each point of the modeled shape must be transformed, in all but the simplest shapes, a very large number of discrete source points must be transformed to target locations. Consequently, it is necessary to either use a large amount of specialized hardware which performs the necessary computations at a very high rate or to make the system non "real time" so that a longer time interval can be allowed to recalculate each image. In a typical computer graphics system, a compromise is made between hardware and recomputation time with the result that most images are not "real time" in that a significant delay is present between the display of separate images of a transformed object.

The speed problem becomes more complicated when "real time" video signals are displayed on each surface of the constructed three-dimensional object. Real time video signals may, for example, consist of "live" television signals and, in order for these signals to remain "live," it is necessary to transform all of the source pixels representing each surface within one field time of a typical television signal, that is, within about 16 milliseconds. Since a typical digitized television signal consists of approximately 230,000 source pixels, a large amount of specialized hardware is necessary to perform the computations necessary to transform each pixel within the required time limit.

Instead of transforming each source pixel to generate a target pixel, once a 3D surface has been constructed, it is also possible to use the computed target pixel location to locate the source pixels which generate the target pixel. When the associated source pixels have been located, the pixel value of the target pixel can be computed directly from the source pixel values. Consequently, only source pixels which actually contribute to the target pixel are used in computations. The required source pixels can be selected from each target pixel by using the inverse of the transformation equations which transform the source pixels into the target pixel. However, when even simple curved surfaces are involved, the mathematics involved in inverting the transformation matrices are extremely complex, involving equations with multiple order variables. The processing of these equations are beyond the processing speed of present day hardware for real-time video applications.

Consequently, it is an object of the present invention to provide a three-dimensional video special effects system which can operate with real-time video information.

It is another object of the present invention to provide a three-dimensional video special effects system in which real-time video information can be generated on a three-dimensional surface which surface can be manipulated while maintaining the real time video on the constructed surfaces.

It is a further object of the present invention to provide a three-dimensional video special effects system which is capable of generating three-dimensional images of a variety of surfaces including planar and curved surfaces.

It is still another object of the present invention to provide a three-dimensional video special effects system which does not require large amounts of special hardware to generate real-time video images.

It is yet another object of the present invention to provide a three-dimensional video special effects system which can achieve three-dimensional transformations in real time.

It is yet another object of the present invention to provide a three-dimensional video special effects system which is easy to use.

SUMMARY OF THE INVENTION

The foregoing problems are solved and the foregoing objects are achieved in one illustrative embodiment of the invention in which real-time video information is digitized and stored in a field memory. A 3D surface is then constructed from a flat source surface, transformed in 3D and then used to select points for mapping a real-time video signal to the constructed surface.

More particularly, the flat source surface is broken into a plurality of flat polygonal patches and the 3D surface is constructed by manipulating the patches in three dimensions. Then, in order to manipulate the entire constructed surface, the vertices of each patch are transformed in order to establish their location in the transformed shape.

Once the patches have been transformed, real time video is mapped to each transformed patch face by using the target points in each patch to determine the necessary source points. This mapping operation requires inverting the transformation equations which are used to transform the patch vertices to the target shape; however, since each of the patches is flat, the inversions are not multiple-order and can be performed in real time.

More specifically, the video mapping method is implemented by high-speed hardware which first determines which patches include a target scan pixel. After determining which patches include the target pixel, additional hardware eliminates "hidden" surfaces by selecting the patch which is closest to a predetermined "view-point". Next, the transformed vertices locations for the selected patch are provided to a manipulator circuit which determines a set of source pixels which will generate the target pixel. The source pixels are then retrieved from the field store, interpolated and filtered to calculate the final target pixel value.

BRIEF DESCRIPTION OF THE DRAWING

FIG. 17 is a field rate sequence diagram showing the "pipelined" nature of the video processing. For example, when PIX A is being viewed, computations for PIX D are being made.

DETAILED DESCRIPTION OF THE PREFERRED EMBODIMENT

As previously mentioned, the inventive special effects processor operates by constructing a 3D surface from planar polygonal "patches" using conventional operations of rotation, translation and scaling on each patch. The entire constructed object is then manipulated in three dimensions by again using the conventional operations of rotation, translation and scaling on each patch.

After the final manipulations have been applied to each patch, the resulting transformation equations are inverted. The output pixel values are generated by using a patch detector circuit to identify the patch in which each output pixel is located. Once the patch identity has been determined, a manipulator circuit uses the inverted transformation equation information to generate selection addresses and filtering coefficients. The selection addresses are used to select source pixels from a field store memory and a high-speed filter/interpolator circuit then uses filter coefficients generated by a manipulator circuit to generate the output pixel values from the selected pixel values.

CREATION OF A 3D SURFACE BY PLANAR PATCHES

Figure 1:
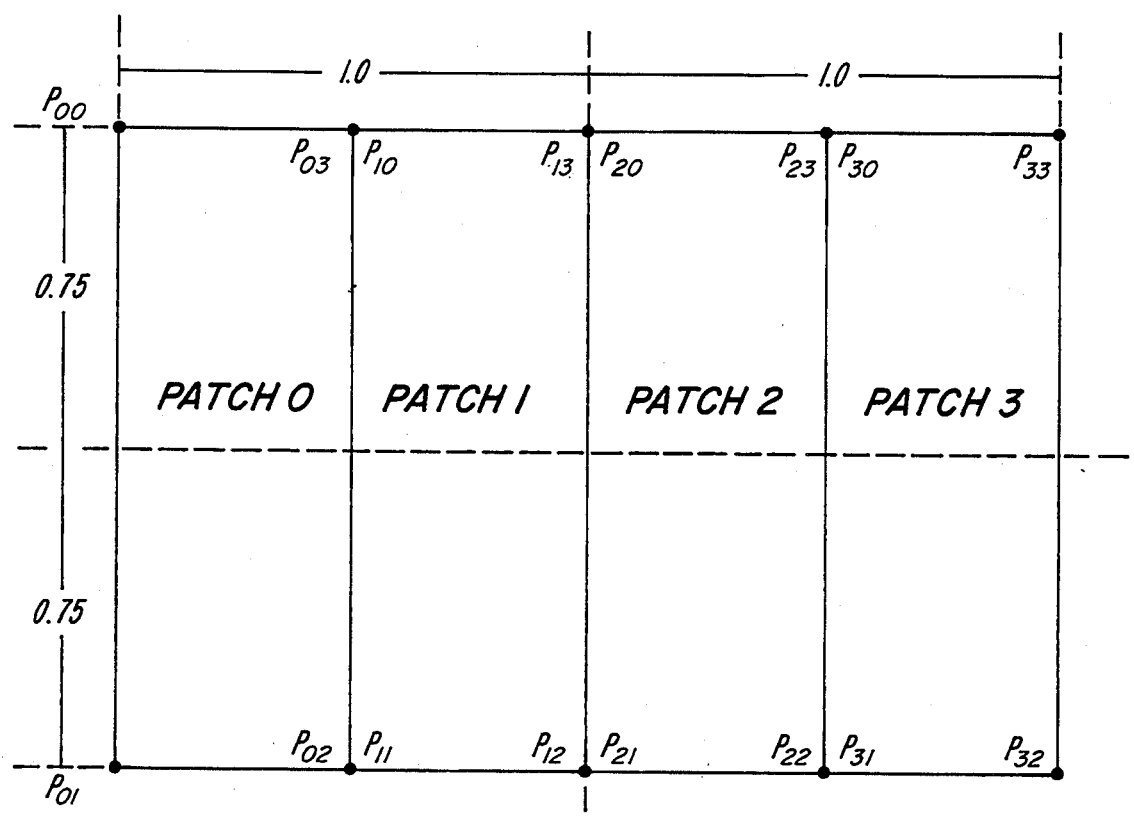
FIG. 1 of the drawing is a schematic illustration of a flat surface divided into a plurality of polygonal patches.

The following steps detail the theory behind the construction of a 3D surface in Cartesian (X,Y,Z) coordinates from planar patches. The planar patches are formed by dividing an initial two-dimensional planar source surface located in the XY plane (Z=0) between the limits $Y=\pm 0.75$ and $X=\pm 1$ as shown in FIG. 1. This source surface is representative of a conventional television raster with a 4:3 aspect ratio.

The source surface is divided into a plurality (N) of convex polygonal patches ("convex" means that all points on a a line connecting any two points within the polygon will also lie within the polygon). The total number of patches is determined by the surface to be constructed. For curved surfaces, the representation will only be approximate and the accuracy will improve as the number of patches increases. However, as the number of patches increases, the amount of processing circuitry required to process the patches also increases, in turn, increasing the system cost. Illustratively, a maximum of 64 patches has been chosen as a reasonable compromise. The actual number of patches used for a particular construction depends on the 3D surface (however, all patches must be convex). For the rectangular tube shown in FIG. 2, four patches are sufficient.

Each patch is given a number i, $0 \leq i \leq N-1$ as set forth in FIG. 1. A patch is uniquely defined by its corner points or vertices. Theoretically, the number of vertices for each patch is arbitrary, but, as the number of vertices increases, so does the amount of circuitry necessary to process the vertices. Illustratively, each patch has been chosen to have four vertices. In their source location, the four vertices for each patch vertex can be represented as four row vectors defined by the equations:

$$PS_j = [X_j\ Y_j\ 0\ 1],\ 0 \leq j \leq 3 \qquad (1)$$

Thus, the set of row vectors for all of the patches in their source positions is defined by the equation:

$$PS_{ij} = [X_{ij}\ Y_{ij}\ 0\ 1],\ 0 \leq i \leq N-1,\ 0 \leq j \leq 3 \qquad (2)$$

Although all of the patches initially begin in the XY plane, the final location of each patch in the constructed surface can be altered independently of the other patches, by translation, rotation and scaling about the X, Y and Z axes by the following well-known transformation matrices.

| | | | | |
|---|---|---|---|---|
| Scaling of each axis dimension S = | $S_x$ | 0 | 0 | 0 |
| | 0 | $S_y$ | 0 | 0 |
| | 0 | 0 | $S_z$ | 0 |
| | 0 | 0 | 0 | 1 |
| Rotation about the Z axis R(α) = | cosα | sinα | 0 | 0 |
| | −sinα | cosα | 0 | 0 |
| | 0 | 0 | 1 | 0 |
| | 0 | 0 | 0 | 1 |
| Rotation about the Y axis R(β) = | cosβ | 0 | −sinβ | 0 |
| | 0 | 1 | 0 | 0 |
| | sinβ | 0 | cosβ | 0 |
| | 0 | 0 | 0 | 1 |
| Rotation about the X axis R(γ) = | 1 | 0 | 0 | 0 |
| | 0 | cosγ | sinγ | 0 |
| | 0 | −sinγ | cosγ | 0 |
| | 0 | 0 | 0 | 1 |
| Translation by an amount Tx, Ty and Tz along X, Y and Z axes T = | 1 | 0 | 0 | 0 |
| | 0 | 1 | 0 | 0 |
| | 0 | 0 | 1 | 0 |

|    |    |    |    |
|----|----|----|----|
| Tx | Ty | Tz | 1  |

To construct a particular surface, the patch movement required to place the patch in its final position must be derived and the overall movement converted to the elements required by the matrices S, R($\alpha$, $\beta$, $\gamma$) and T.

After the matrix numbers have been determined, a combined matrix can be derived by multiplying the matrices to form an overall patch transformation matrix $S_p \cdot R_p \cdot T_p$. This patch matrix is then used to transform each patch vertex location PSij into a target vertex location PTij by means of the equation:

$$PTij = PSij \cdot S_p \cdot R_p \cdot T_p \quad (3)$$

where PSij is the source location of the patch vertex (i) which is transformed to the target location $PT_{ij}$.

Figure 2A:
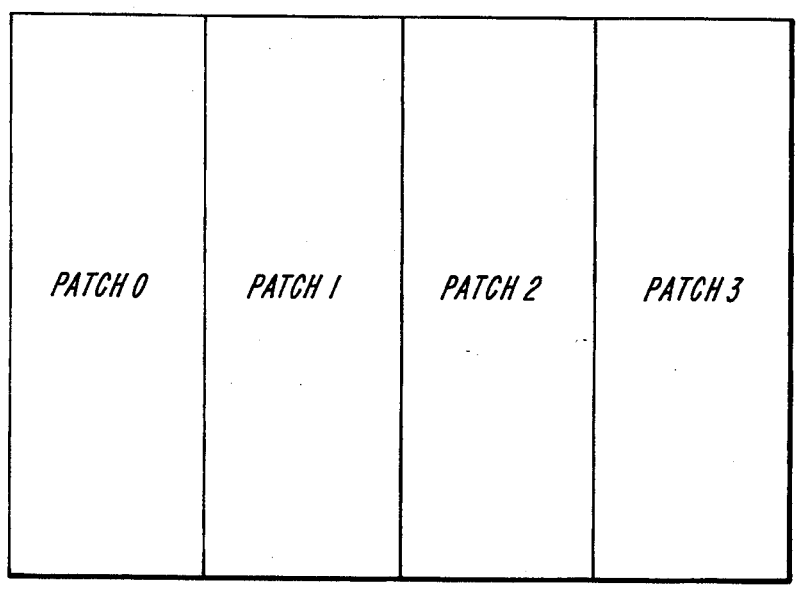
FIGS. 2A–2D are schematic illustrations of single steps in a four-step construction of a 3D rectangular tube using the patches set forth in FIG. 1.
Figure 2B:
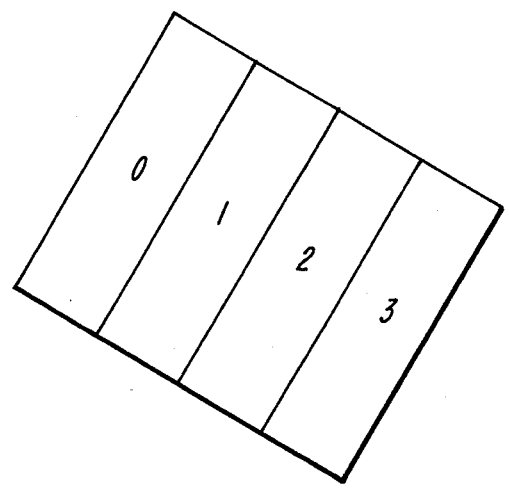
Figure 2C:
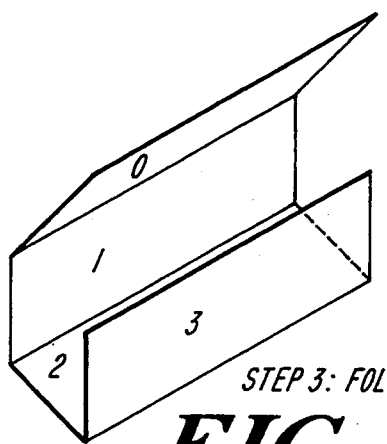
Figure 2D:
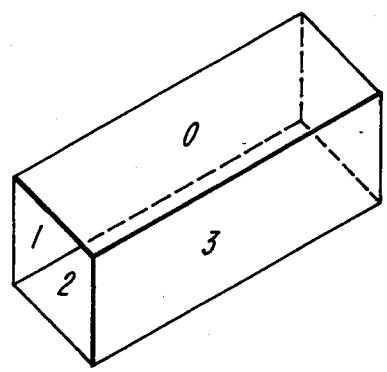

The total evolution process from the initial planar source surface to the constructed 3D surface is divided into discrete steps which can be separately displayed on the screen. An example of the step-by-step construction of a 3D surface using this method is shown in FIGS. 2A–2D in which a rotated rectangular tube is constructed. As shown in FIG. 2A, the initial planar surface is divided into the four patches set forth in FIG. 1. The next two steps in the evolution are shown in FIG. 2B in which the initial plane is scaled and rotated. In step 2C the patches are further rotated to "fold up" the flat initial surface into the final tubular surface shown in FIG. 2D. For flexibility, the construction process can be halted after any step in the evolution and the speed of evolution can also be varied. However, if real-time video information is to be mapped to the constructed surface, there is an implied limitation that each step in the evolution must remain static for at least the time interval of one television field.

Once the 3D surface has been formed by the separate transformation of each patch, the entire surface can be moved as a unit in three-dimensional space by multiplying each patch transformation matrix $PSij \cdot S_p \cdot R_p \cdot T_p$ by an object transformation matrix $S_o \cdot R_o \cdot T_o$ whose elements are determined by the final object orientation in three-dimensional space. The resulting vertex final locations POij are thus computed as follows:

$$POi = PSij \cdot S_p \cdot R_p \cdot T_p \cdot S_o \cdot R_o \cdot T_o \quad (4)$$

Equation (4) determines the vertex locations of the patches in a constructed "wireframe" surface. Next, the Z-axis position or "depth" of each patch (relative to a viewer at point $Z_o$ on the Z axis) must be determined so that hidden surfaces can be removed from the transformed shape when real-time video information is mapped to the 3D surface. Finally, the transformed location of each patch vertex in the constructed surface must be projected onto a two-dimensional "viewport" area representative of a television display area.

The transformed patches are given depth and projected onto the video viewport by multiplying each transformed point POij by a perspective matrix P, where $$P = \begin{matrix} 1 & 0 & 0 & 0 \\ 0 & 1 & 0 & 0 \\ 0 & 0 & 0 & -1/Z_o \\ 0 & 0 & 0 & 1 \end{matrix}$$

and $Z_o$ is the distance from the point POij to the position of a hypothetical viewer located on the Z axis in the three-dimensional space. Thus, the final location of the patch vertex points on the viewport surface is given by the equation:

$$PVij = POij \cdot P \quad (5)$$

The result of the above transformations is a set of four matrix equations for each patch, each equation of the set representing the transformations necessary to move one patch vertex from its source location to its target location on the planar viewport. The parameters of the viewport are chosen to give it a 4:3 aspect ratio so that it is representative of a conventional television display area. The coefficients corresponding to each matrix equation are dependent on the constructed shape and its transformation. Since the construction of the shape is carried out in steps in which each step remains static for one or more video fields, the coefficients can be determined prior to each video field and stored. In addition, the locations PVij of the patch vertex points can be calculated and stored. The stored coefficients and locations will then govern the display for that entire video field.

MAPPING OF REAL-TIME VIDEO TO THE CONSTRUCTED SURFACE

Advantageously, in accordance with the invention, once the matrix coefficients and the transformed location of the patch vertex points have been determined, real-time video is mapped to the constructed surface by using the transformed target points to select the source pixels necessary to determine the target pixel value. Thus, it is not necessary to transform each source pixel by means of the computed transformation coefficients. More particularly, before each video field begins it is possible to invert the aforementioned matrix equations to determine inverted coefficients. It is possible to do this inversion because each patch is planar and thus the matrix equations which determine its transformation are linear. Consequently, the calculations which are necessary to invert the matrix are sufficiently simple that they can be carried out with a reasonable amount of hardware within the time limit of one television field interval. The inverted equations can then be applied to each target point to determine the pixel or pixels which must be processed to result in the final target pixel.

More particularly, in accordance with the inventive mapping method, it is only necessary to scan the output viewport and determine in which patch or patches each output point lies. Once the patch is identified, the inverted equations can be used to select source pixels for processing.

At the start of each video field, digitized pixels are stored in a random access field memory to provide a set of source pixels. Each pixel sample is timed to coincide with the scan point locations on the viewport surface. The inventive mapping process requires that the two-dimensional viewport surface be scanned in discrete steps or target points. The scanning is conducted in a sequence which coincides with a conventional television display sequence—horizontally and vertically from the upper left corner of the space to the lower right corner of the space.

Figure 3:
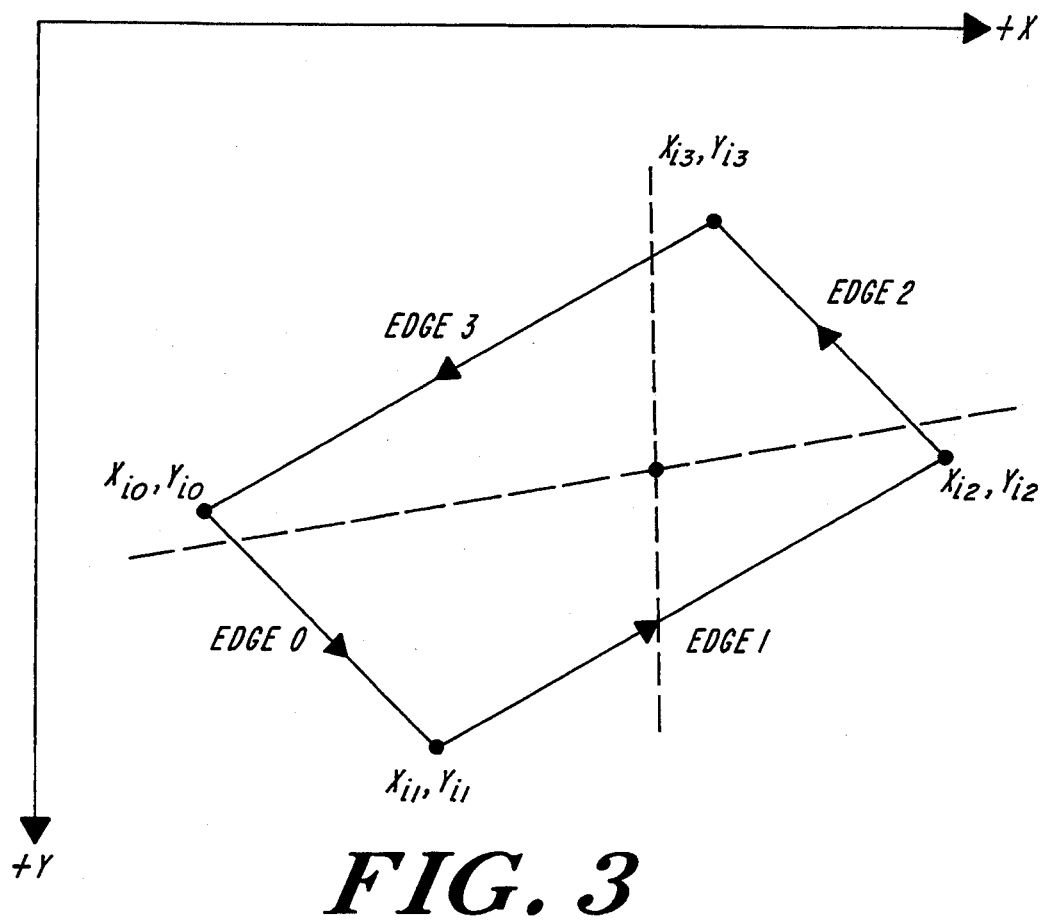
FIG. 3 is a diagram of an illustration indicating the method of operation of a patch detector circuit which determines whether a target scan pixel lies within a particular patch.

At each scanning step, the viewport is examined to determine whether the target point is located within the boundaries of one or more patches, or whether the target point is located outside the boundaries of all the patches. The location of the target point relative to patch boundaries requires the determination of the patch boundaries. Each boundary is considered to be a straight line edge connecting two vertices as shown in FIG. 3. For example Edge 0 is the straight line connecting vertex Xi0, Yi0 to the vertex Xi1, Yi1. Similarly, Edge 1 is the straight line connecting vertex Xi1, Yi1 to the vertex Xi2, Yi2. When the patch boundaries are selected in this way, equations for the patch boundaries can be written in the form:

$$A(PV_{ij})X + B(PV_{ij})Y + C(PV_{ij}) = 0 \tag{6}$$

where the coefficients A, B and C can be computed using the stored patch vertex locations $PV_{ij}$ determined in equation (5). (Illustratively, in FIG. 3, for edge 0, the A, B and C coefficients are given by $A = Yi0 - Yi1$, $B = Xi1 - Xi0$ and $C = Yi1(xi0 - xi1) - xi1(Yi0 - Yi1)$. Similar expressions can be derived in a straight-forward manner for the coefficients for edges 1-3). Each patch also acquires an "orientation" characteristic (clockwise or counterclockwise) which depends on the direction in which the vertices are approached when computing the three coefficients (the orientation is "counter-clockwise" in FIG. 3). As described below, in order to prevent ambiguity when a point is located on the boundary of a patch, the coefficients are always computed with a counter-clockwise orientation.

In order to determine whether a given scan point is within the boundaries of a particular patch, the X and Y coordinates of the scan point are inserted into the four equations for the patch boundaries of that patch. Unless the scan point lies on the patch boundary so that equation (6) is satisfied, the calculated result will be non-zero (either positive or negative). In accordance with conventional, well-known mathematical theory, for a given scan point, if all four equations for a patch yield a computed result with the same sign (all positive for a counter-clockwise orientation or all negative for a clockwise orientation), the scan point is located within the patch boundaries.

Thus, for each scan point, the results of four equations in the form (6) for each patch in the constructed 3D shape are computed to determine whether the point lies within one or more of the patches. Since the A, B and C coefficients are computed with a counter-clockwise orientation, all signs will be positive. (If the patch has been manipulated in three dimensions so that it has "flipped over" causing its orientation to be clockwise, the computation software generates an "orient" signal which is used to correct the signs during the patch detection process). In the case where the scan point is within the boundaries of more than one patch, then the depths or Z positions of the patches determine which patch will be selected for display (patches closest to the viewer are selected for display).

Advantageously, in accordance with the invention, once a patch has been selected, it can be used to retrieve the stored inverted coefficients which were computed at the beginning of the video field. From these coefficients, as previously mentioned, it can be determined how the patch source pixels must be manipulated in order to generate the target pixel value. The process of patch selection and the computation of the output pixel value must be performed during the time interval allocated to each scanning step (approximately 70 nanoseconds for real-time video information).

More particularly, when the patch selection process determines the patch number corresponding to a particular scan point, the scan point X and Y coordinates are used in the inverse equations to yield the location in the field memory of a set of pixels. These pixels are retrieved, combined and filtered to generate an output pixel value which is displayed at the location of the scan point on the television display. At each scan point which lies within a particular patch the inverse equations remain the same, but as the scan point leaves one patch and enters another, the equations for pixel retrieval change. If a scan point is located outside the boundaries of all patches, a predetermined background signal is displayed on the television display.

VIDEO SPECIAL EFFECTS SYSTEM

The inventive video special effects system consists of a communication and control circuit and a video processing unit. The communication and control circuit provides an interface between the system user and the video processing unit, distributes data between the various system resources and computes transformation matrix and filter coefficients for video processing. The video processing unit digitizes analog video information and stores the resulting source pixels. Based on data computed by the communication and control circuit, the video processing unit identifies a patch in which an output scan point lies, retrieves the appropriate stored source pixels and performs the necessary filtering and manipulation to generate output analog video for display. The video processing unit also performs conventional video processing such as mosaic, posterization and cropping on the video signal.

Figure 4:
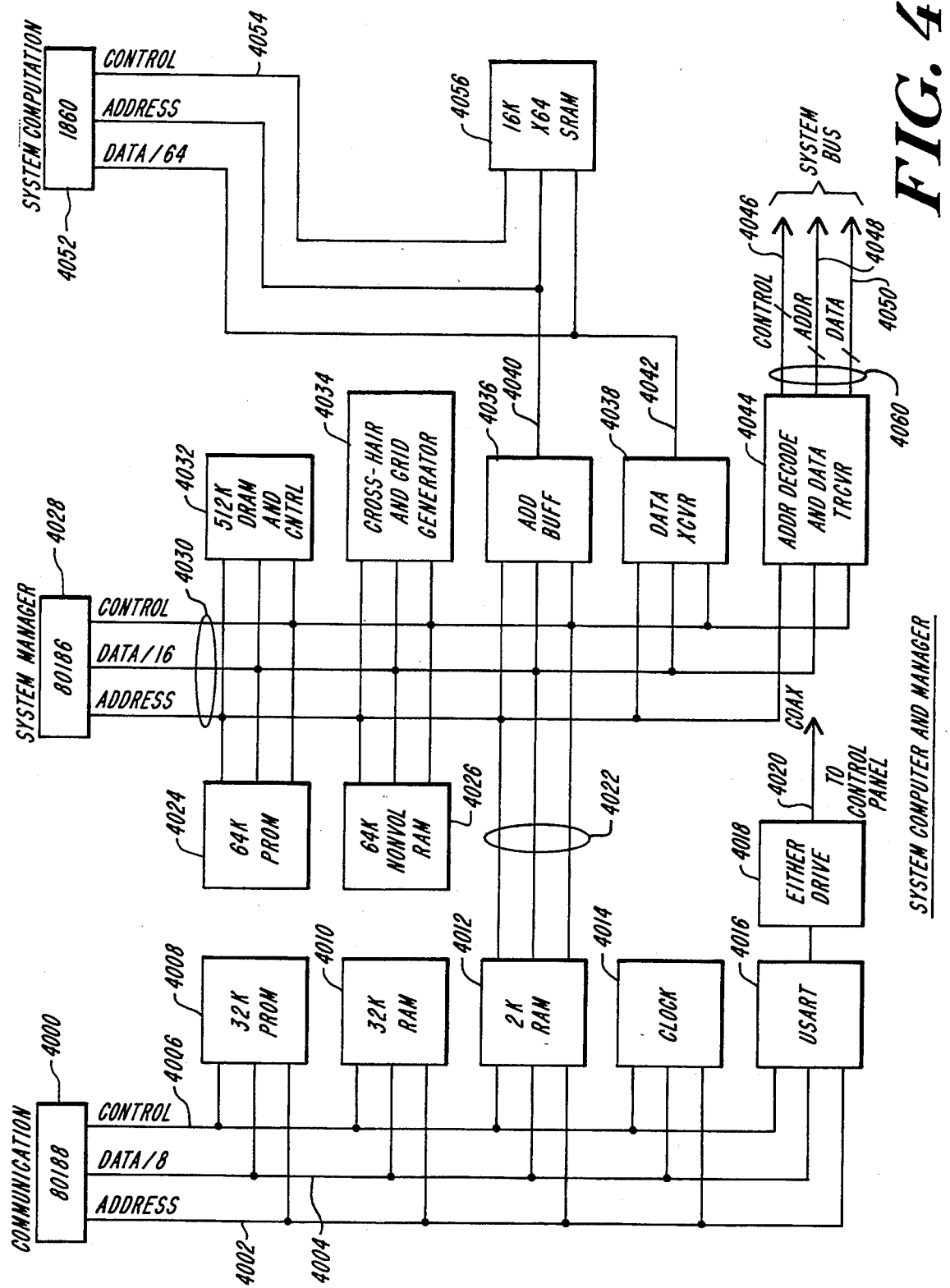
FIG. 4 is an electrical schematic block diagram of the communication and control circuitry for the video special effects system.

FIG. 4 illustrates the major functional components of the communication and control circuit which is comprised of three separate computers and supporting elements. More particularly, the special effects system is controlled from a conventional control panel (not shown) which may include joysticks, pushbuttons and other programmable input devices that allow the user to specify various special effects which are to be generated by the system. A control panel suitable for use with the present embodiment is designated as an RP-1 control panel manufactured by Microtime, Inc., 1250 Blue Hills Avenue, Bloomfield, Conn.

Commands generated by the control panel are recognized and processed by processor 4000 which may illustratively be microprocessor model number 80188 manufactured by Intel, Incorporated, located at 3065 Bowers Avenue, Santa Clara, Calif. 95051. Microprocessor 4000 is connected by means of multi-wire computer buses 4002–4006 to a plurality of peripheral units including 32K PROM memory 4008, 32K RAM memory 4010, 2K RAM memory 4012, clock generator 4014 and transceiver (USART) 4016. In a conventional fashion, three separate buses interconnect functional units—address bus 4002, eight-bit data bus 4004 and control bus 4006. Although these buses are shown as single heavy lines in FIG. 4, they, in fact, consist of multiple wires.

The commands are provided, via coax cable 4020, to an ETHERNET drive unit 4018. This is a conventional interface circuit which converts ETHERNET signals on the coax cable 4020 into digital signals suitable for controlling the special effects system. The converted digital signals are provided to transceiver 4016, which, in turn, synchronizes the signals and generates the appropriate address and data signals on address and data buses, 4002 and 4004 which convey the signals to processor 4000.

Processor 4000 is driven by clock signals generated by a clock unit 4014 and operates under control of a program stored in the 32K PROM 4008. Processor 4000 also has use of a 32K RAM memory 4010 in which to store data. The program is designed to recognize signals generated by the control panel as commands for manipulating the video signals and to convert the commands into control signals for controlling the computation processor and the video processing unit as will hereinafter be described. A programmed priority allows more critical instructions generated by the user to be handled first followed by less critical instructions. It is also possible that a particular manipulation sequence could be pre-programmed and loaded directly into memory 4010 and control the operation of the special effects system. In either case, the program which controls processor 4000 is conventional and will not be discussed in detail herein.

In response to the user commands, processor 4000 generates coded instructions which are temporarily stored in 2K RAM 4012. RAM 4012 is a conventional dual-port memory which has a second bus set, 4022, that is connected to an internal communication bus 4030 that is, in turn, connected to processor 4028. Processor 4028 may illustratively be a model 80186 microprocessor manufactures by Intel Incorporated. Thus, commands generated by processor 4000 can be written into memory 4012 and later read by processor 4028 at an appropriate time during system operation.

Computer 4028 acts as a system manager and determines whether the instructions stored in RAM 4012 are forwarded to computation computer 4052 or to the video processing unit (not shown in FIG. 4) via system bus 4060.

More specifically, processor 4028 operates under control of a program stored in 64K PROM 4024. The results of computations by processor 4028 can be stored in 512K DRAM 4032 and in 64K non-volatile RAM unit 4026. Also connected to communication bus 430 is a conventional crosshair/grid generator 4034 which can generate a crosshair cursor and grid pattern on the video display screen that allows the user to manipulate the special effects more easily.

Processor 4028 examines the commands generated by processor 4000 stored in RAM memory 4012. If the commands are designated to control computation computer 4052, they are routed, via bus 4022, data transceiver 4038 and computation bus 4042 to computer 4052. Alternatively, commands can be routed, via bus 4022 and address decode/data transceiver unit 4044 to system bus 4060 and from there, to the video processing unit (not shown in FIG. 4).

All high-speed floating-point and fixed-point computations are performed by the system computation computer 4052. A computer suitable for use with the illustrative embodiment is a high-speed 64-bit computer as a model i860 manufactured by the Intel Corporation. Such a computer typically has a clock frequency of 33 megahertz. Processor 4052 computes the matrix coefficients, the inverse coefficients and other mathematical computations necessary for the manipulation of the video signals.

The results of the computations are provided, via 64-bit bus 4054, to 16K SRAM (static RAM) memory 4056. All values computed by computer 4052 during a television field are stored in memory 4056 until the next television field, at which time, the values are distributed to the video processing unit under control of processor 4028.

In order to make the distribution, processor 4028 accesses memory 4056 via address buffer 4036. Data in memory 4056 is read and provided to computation bus 4042 and from there, via data transceivers 4038 and 4044, to system bus 4060 and the video processing unit.

Figure 5:
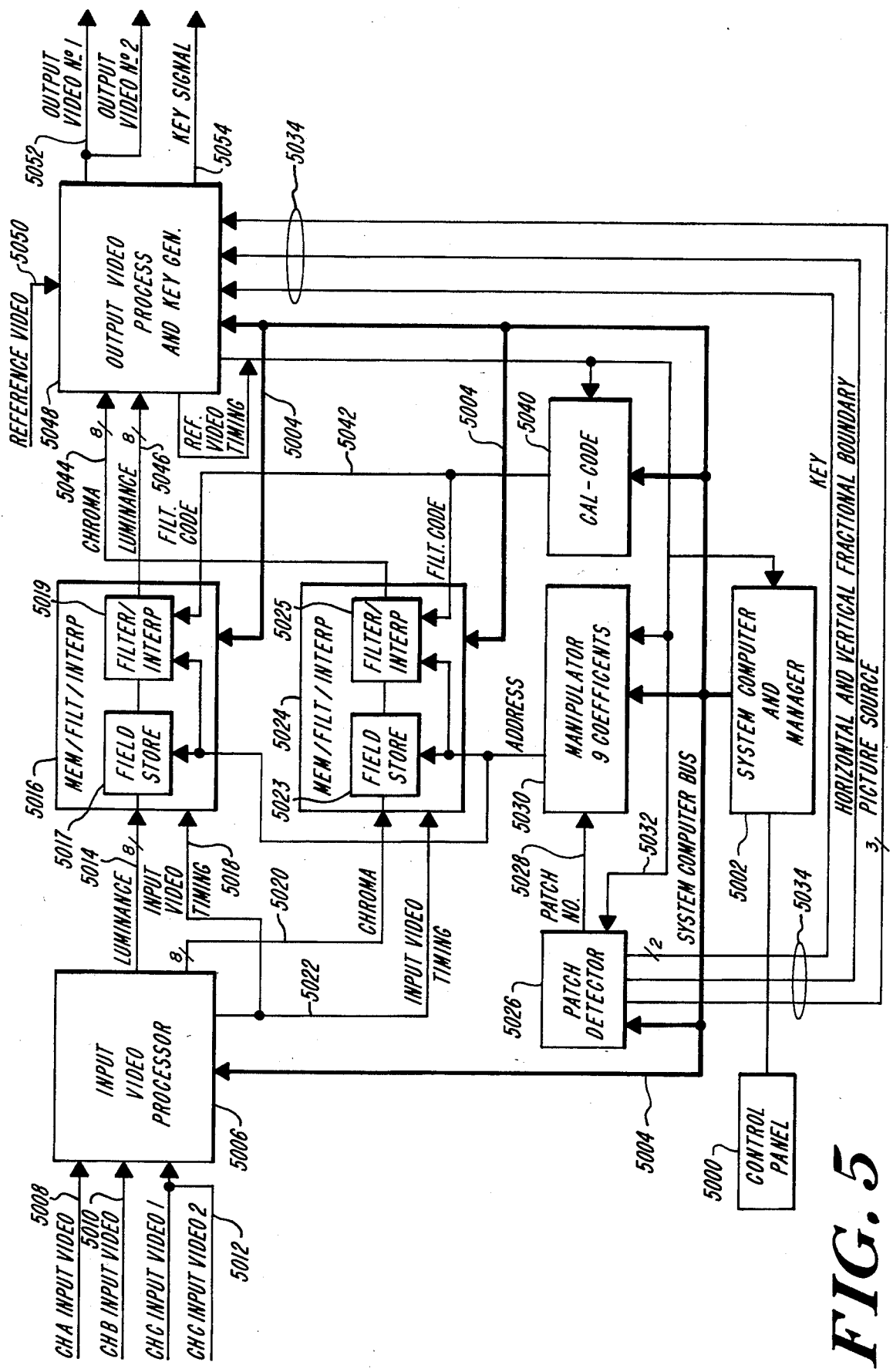
FIG. 5 is an electrical schematic block diagram of the video signal processing circuitry.

A general block diagram of the video processing unit is shown in FIG. 5. As previously mentioned, system manager 5002 (discussed in detail with respect to FIG. 4) generates command and control information for the video processor unit on system bus 5004 which information coordinates the operation of all of the elements of the video processing unit. Under control of the signals on bus 5004, input video processor 5006 accepts live analog video on three separate channels 5008, 5010 and 5012, digitizes the analog information, retimes the signals so that they are synchronized with respect to each other, separates the chrominance and luminance information and extracts timing information from the sync and burst signals to generate various timing signals.

The digitized luminance information for all three channels is time-multiplexed onto eight-bit bus output bus 5014 and provided to field memory/filter unit 5016, which contains field memory 5017 and filter/interpolator 5019. The information stored in memory 5017 represents the source pixel array. Selected pixels in this array are retrieved and processed by filter/interpolator 5019 to generate the output pixel values as will be discussed in detail below.

The separated chroma signals are provided (via an eight-bit bus on which the three channels are time-shared similar to the luminance information) to a separate memory/filter circuit 5024 which consists of field memory 5023 and filter/interpolator 5025. The luminance and chrominance signals are processed in parallel to decrease the processing time of the system. Timing information generated by input video processor 5006 is also provided, via bus 5022, to both memory/filter unit 5016 and memory/filter unit 5024.

As previously mentioned, during operation of the system, the system computer and manager 5002 computes and stores information, including forward and inverse transform coefficients, that is necessary to construct a desired three-dimensional surface. These coefficients and the target point position are provided, via system bus 5004, to patch detector 5026. Detector 5026, as previously mentioned, determines in which patch a target scan point lies. Also provided to patch detector 5026 is retimed reference video information via bus 5032. This reference information is generated by output video processor 5048 from a reference signal 5050.

In response to the coefficient and reference information, patch detector 5026 generates a coded patch number on bus 5028 which identifies the patch in which the target scan point lies. In addition, patch detector 5026 produces output codes on buses 5034 indicating whether or not the output scan point is part of a key signal, the source of video information (which channel generated the video information) and horizontal and vertical fractional boundary information. The fractional boundary information is necessary to properly position output pixels which lie on, or close to, a patch boundary.

At the beginning of each field, system computer 5002 loads manipulator circuit 5030 with the coefficients of the inverse transforms as discussed above. During the next field time and, in response to the reference video information on bus 5032 and a patch number on bus 5028 generated by patch detector 5026, manipulator 5030 generates address information which is provided to luminance field store 5017 and chrominance field store 5023. The address information selects the particular source pixels which are to be used to generate the target pixel.

The pixels are retrieved from stores 5017 and 5023 and provided to filter/interpolator circuits 5019 and 5025. These circuits act to filter and interpolate the source signals to generate the target pixel value. The processing of the source pixels by filter/interpolators 5019 and 5025 is, in turn, controlled by a filter code signal generated by calcode circuit 5040. Calcode circuit 5040 receives information from system computer 5002 and the reference video information on bus 5032 and generates a coded signal which controls the filters to generate an output luminance signal on bus 5044 and an output chrominance signal on bus 5046.

The luminance and chrominance signals are provided to an output video processor 5048 which recombines the separated luminance and chrominance information. In response to the horizontal and vertical boundary information generated by patch detector 5026 on buses 5034, output video processor 5048 performs an additional interpolation if the source pixels are close the boundary of a patch. In addition, the output video processor also generates key signals, if appropriate, and performs some additional further conventional processing such as trails, sparkles and other special effects. Finally, blanking and timing signals are added back to the video signal to produce an output analog video signal on bus 5052 and a key signal, if appropriate, on bus 5054.

Figure 6:
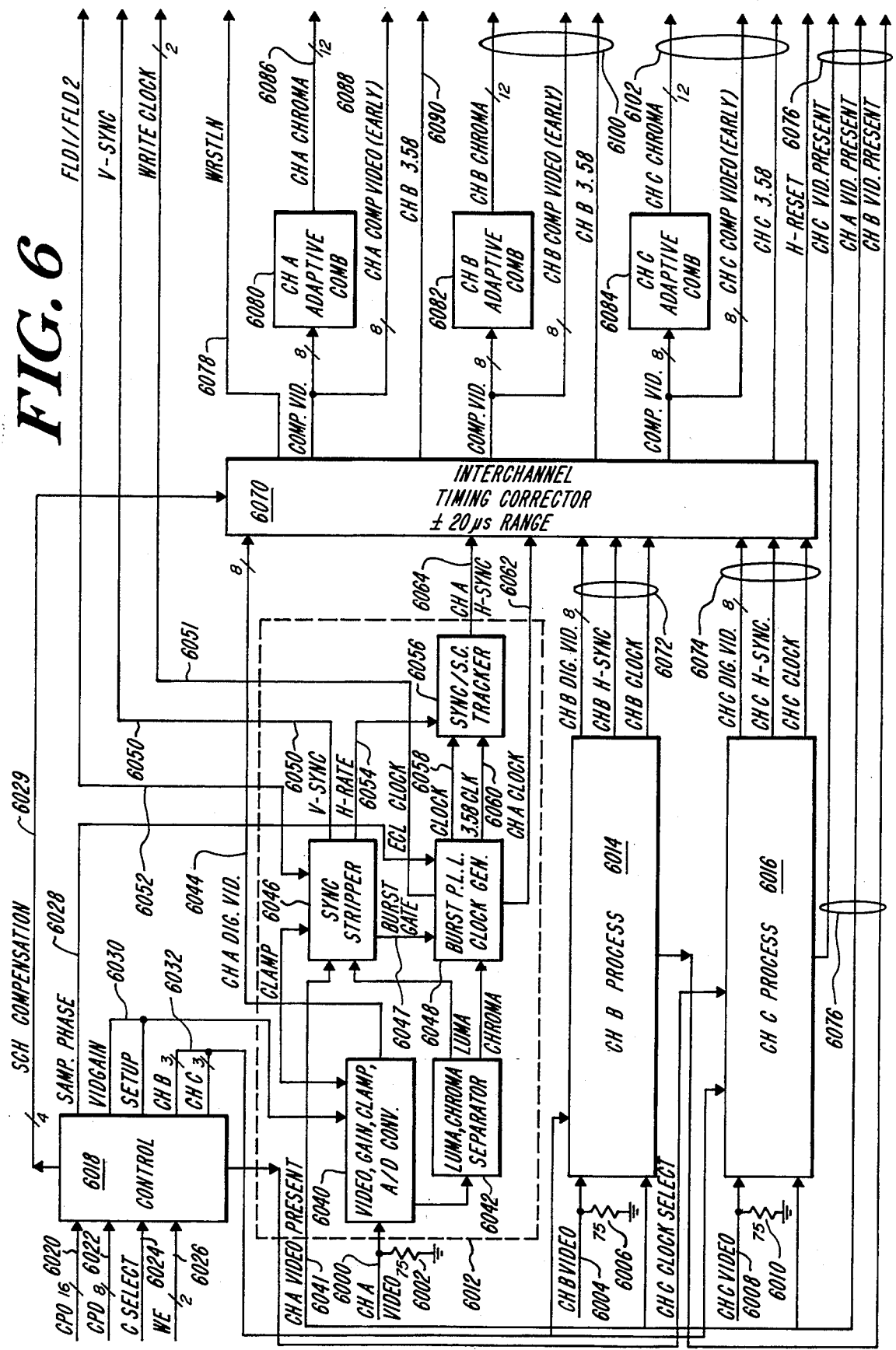
FIG. 6 is an electrical schematic block diagram of an analog video processor circuit which receives incoming analog video information on three separate channels, digitizes the information, separates luminance and chrominance signals, retimes and filters the video information.

FIG. 6 shows the input video processor 5006 in more detail. More particularly, live analog video from three separate sources designated as Channel A (CH A), Channel B (CH B) and Channel C (CH C) is received at inputs 6000–6008, which are terminated by 75-ohm resistors 6002–6010, respectively. Illustratively, the three video sources must be timed to within 20 microseconds of each other for the input video processor to properly compensate for timing differences. Within the processor, the processing for each channel is identical and, for purposes of clarity, only the processing circuitry of Channel A will be described in detail.

The operation of the analog video processor can be controlled by the user from the special effects control panel through the system manager as discussed with respect to FIG. 4. As previously mentioned, the system manager communicates with the input video processor by means of a system bus which includes 16-bit address bus 6020, eight-bit data bus 6022 card select line 6024 and 2-bit write enable bus 6026. The signals on the latter lines are provided to processor control unit 6018 which decodes the address, data and control signals to generate video gain, hue and setup signals. The bus address, data and control lines enable a user to control the video gain, setup level and encoding (sampling) clock phase (hue) used by the input video processor. In response to the signals, control unit 6018 generates control signals, including: a D.C. sampling phase signal (line 6028), D.C. signals for video gain and setup level (for Channel A on lead 6030 and for Channels B and C on leads 6032) and a four-bit interchannel time compensation control signal (on bus 6029).

Under control of unit 6018, each of the video signals present at inputs 6000–6008, is digitized and processed to separate the luma and chroma information and recover video timing signals. In particular, the analog video at input 6000 is provided to a video gain, clamp and A/D converter circuit 6040. Circuit 6040 is a conventional circuit in which the composite analog video signal (comprised of luminance and chrominance information) is encoded into an eight-bit digital video signal on eight-bit output bus 6044. In addition, the analog composite video information is provided to a luma/chroma separator circuit 6042 which separates the luma and chroma information.

The luma information is provided to sync stripper circuit 6046 which detects and regenerates various timing signals present in the luma information. In particular, circuit 6046 produces a clamping signal which is applied to, and controls, the absolute signal level into the A/D converter circuit 6040. Circuit 6046 also generates: (a) FLD1/FLD2 signal on lead 6052 indicating the which of the two video fields is being processed; (b) vertical sync pulses on lead 6050 indicating the start of each picture field; (c) a horizontal rate signal on lead 6054 which is used to generate horizontal timing pulses (d) a burst gate signal on lead 6047 which is used to isolate the burst signal and (e) a video present signal on lead 6041 which indicates whether Channel A has actual video present.

The burst gate signal on lead 6047 and chroma information from separator circuit 6042 are provided to phase-locked-loop circuit 6048 which is a conventional timing circuit that extracts color subcarrier clock information on lead 6058 and regenerates the 3.58 megahertz burst clock on lead 6060. P.L.L. circuit 6048 also generates a write clock signal on lead 6051 and a 3.58 megahertz clock signal on lead 6062.

The clock signal on lead 6058, the 3.58 megahertz burst signal on lead 6060 and the horizontal rate signal on lead 6054 are provided to sync tracker circuit 6056 which regenerates horizontal timing pulses (synchronized to the 3.58 megahertz signal on lead 6060) on lead 6064 that indicate the start of each scan line.

The digital video information on lead 6044, the horizontal sync pulses on lead 6064 and the clock signal on 6062 are provided to an interchannel timing corrector 6070. Similar signals are developed by Channel B processing circuit 6014 on leads 6072 and Channel C processing circuitry 6016 on leads 6074.

Interchannel timing corrector 6070 is a conventional circuit which uses the horizontal sync information to retime the video in Channels B and C to the video in Channel A. The corrector has a ±20 microsecond range so that the allowed timing variations in the input signals can be accommodated. The interchannel timing corrector generates a write start line signal WRSTLN on line 6078 which signal is used to synchronize the remainder of the circuitry. Interchannel timing corrector 6070 also generates digitized composite video and a 3.58 megahertz clock for each of the three Channels A, B and C.

The retimed, digitized composite video is produced on lead 6088 and the retimed burst clock is produced on lead 6090. The composite video for each channel is also filtered to extract the chroma information by means of a conventional comb filter. In particular, composite video for Channel A is provided to adaptive comb filter 6080 to extract and generate chroma information on lead 6086. Illustratively, comb filter 6080 may be a conventional three-path comb filter. However, preferably, filter 6080 is arranged to examine the incoming stream of pixels and to modify the "comb" filter to a "notch" filter when adjacent pixel similarity falls below a predetermined threshold. This change is necessary since the efficiency of a conventional comb filter depends on close similarity of adjacent pixels. In this manner, the filtering action can be optimized to suit a particular video display.

Similarly, comb filter 6082 processes the video signal in Channel B and comb filter 6084 processes the signal in Channel C producing output signals 6100 for channel B and 6102 for channel C respectively. The video present signals on leads 6076 generated by processing circuits 6012–6016 are also provided to the remainder of the circuitry.

Figure 7:
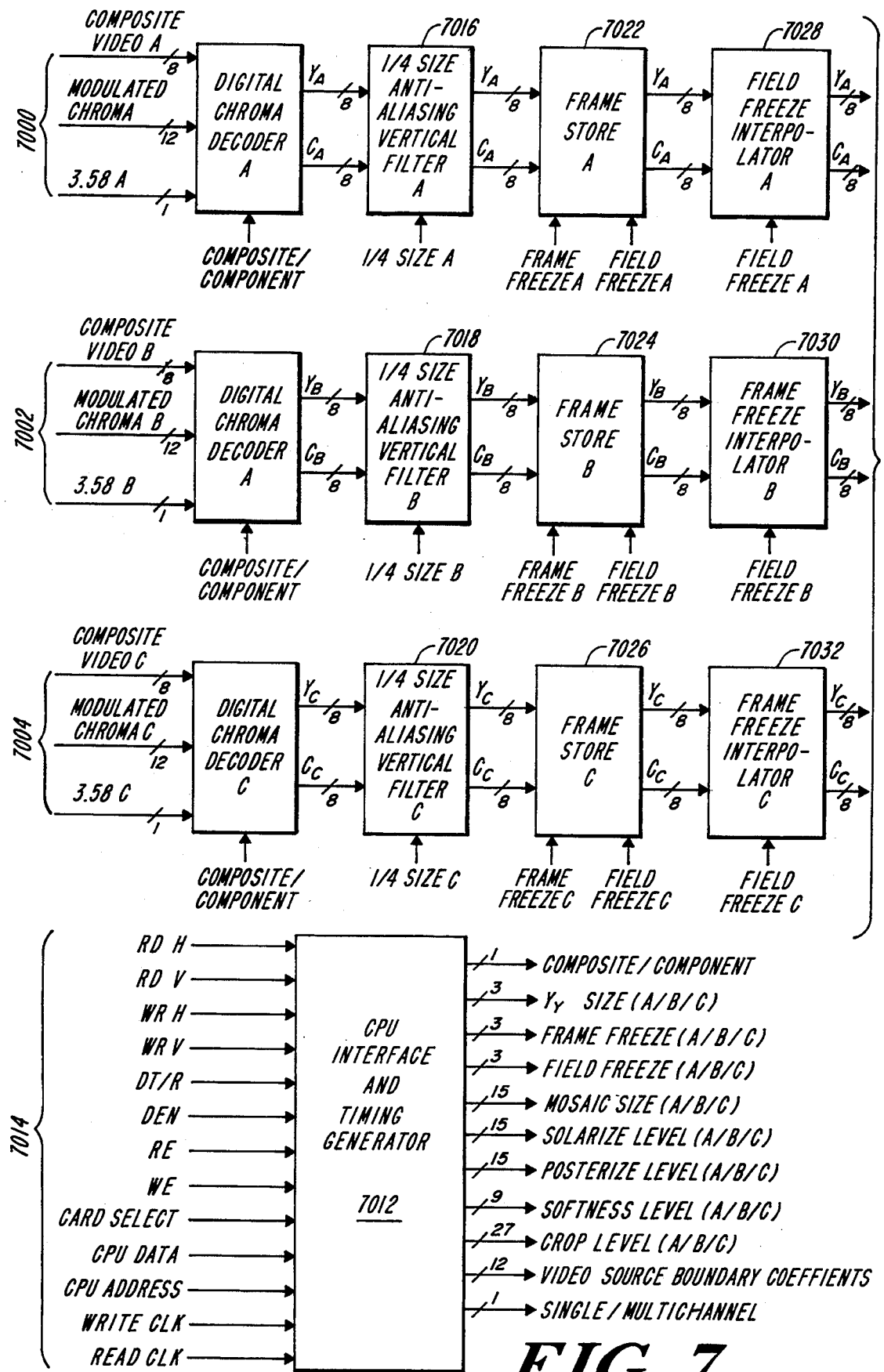
FIG. 7 is an electrical schematic block diagram of a digital video processor unit which stores a frame of digitized video information for frame freeze effects, performs special effects processing such as mosaic, posterization and cropping and selects one of the three channels for further processing.
Figure 7:
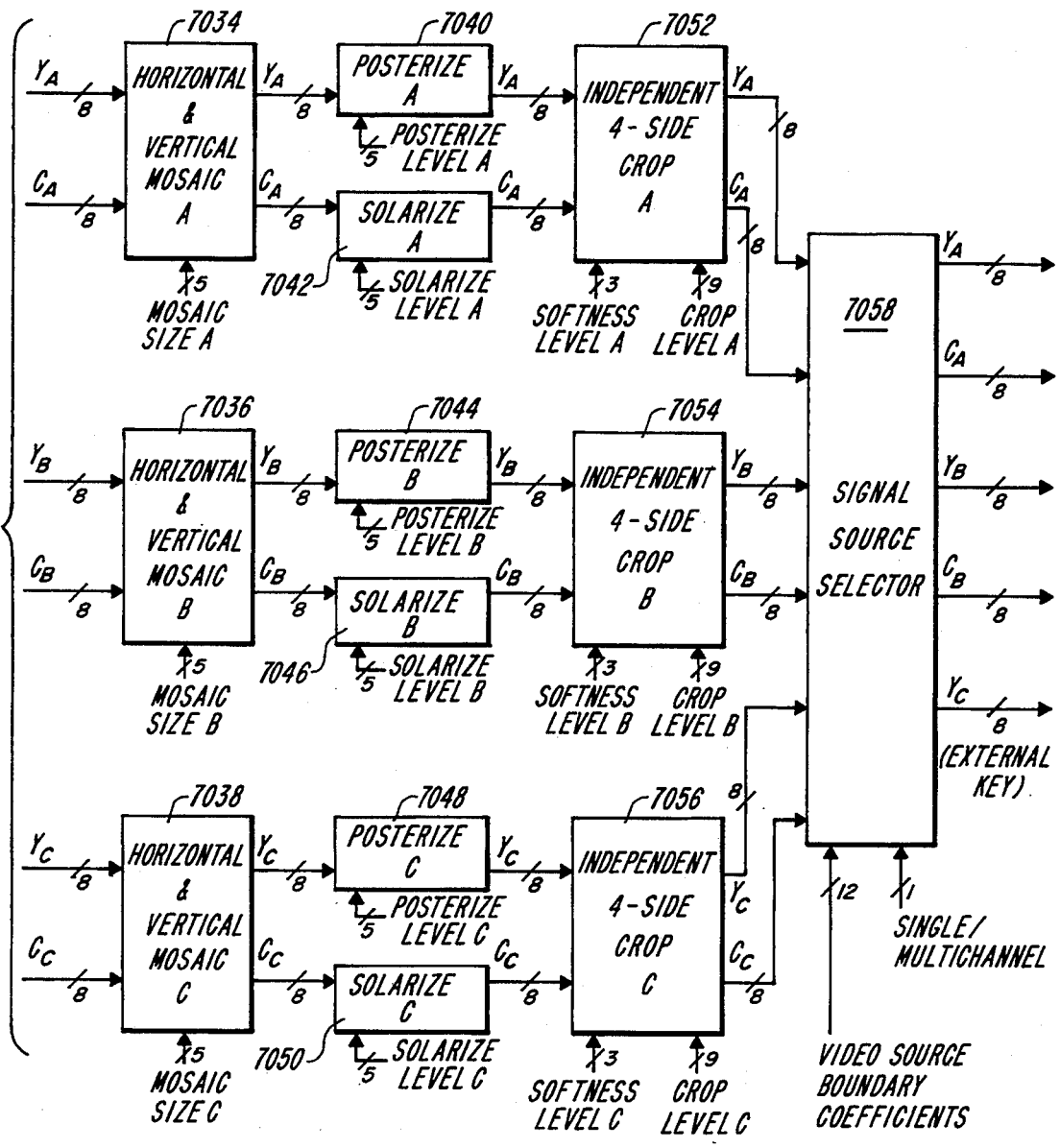

The composite video signal, the isolated chroma signal and the 3.58 megahertz clock signal developed for each of the three channels is further processed in the input video processor circuitry shown in FIG. 7. Each of the three channels is processed in a similar manner under control of command and control signals developed by the communication and control system described in connection with FIG. 4.

Command signals 7014 are provided to a CPU interface and timing generator circuit 7012. Signals 7014 include horizontal read and vertical read enable leads, horizontal and vertical write enable leads, a card select signal, a 16-bit data bus, a 15-bit address bus and write and read clocks. In response to signals 7014, CPU interface and timing generator circuit 7012 develops a plurality of control signals which control the video processing components shown in FIG. 7. The control signals include a composite/component signal which determines whether the components of each of the video signals or the entire composite signal is processed; a quarter-size compression signal (which will hereinafter be described in more detail) which causes the picture in each of the channels to be compressed to one-quarter size. Also included are field-freeze and frame-freeze signals, which are used to freeze either a field or a frame of the video signal and signals which control various conventional special effects such as the mosaic, solarization, posterization, softness and cropping.

More particularly, the composite video, isolated chroma and burst clock signals generated by the circuitry shown in FIG. 6 for channel A are provided as signals 7000 to digital chroma decoder circuit 7006. In a similar manner, video signals 7002 for channel B are provided to chroma decoder 7008 and signals 7004 for channel C are provided to chroma decoder 7010. In a conventional decoder circuits such as decoder 7006, the isolated chroma signal is subtracted from the composite video signal to generate a video signal luminance component. After the luminance component has been generated, the chroma signal is digitally demodulated into a multiplexed data stream of baseband (R-Y, B-Y) chroma components. The output of chroma decoding circuit 7006 is an eight-bit luminance signal on a luminance bus YA and an eight-bit chrominance signal on chrominance bus CA. These latter two buses pass through the remainder of the circuits that, in turn, generate the various video special effects processed by the system.

Similar processing is provided for channels B and C so that luminance information is provided to the circuitry on buses YB and YC and chrominance information is provided on buses CB and CC.

More particularly, after the luminance and chrominance signals are generated for each of the three channels, the three video signals (each comprised of luminance and chrominance information) written into frame stores 7022–7026 to provide a delay of one picture frame. In accordance with one feature of the invention, frame stores 7022–7026 may also be used to "compress" the picture to one-quarter size by writing alternate pixels. When picture compression is performed, additional anti-aliasing vertical filters 7016–7020 are controlled by interface circuit 7014 (via the "¼ Size" signals) to process the signal prior to storage in stores 7022–7026. Frame stores 7022–7026 may also be used to "freeze" the picture by cessation of the writing function (under control of the "Frame Freeze" signal"). An entire frame, or either field (under control of the "Field Freeze" signal), may be stored and continually read independently from each buffer. In the case when the picture is "frozen" for a field, interface circuit 7014 controls field freeze interpolators 7028–7032 to cause additional interpolation on the signal.

Other ancillary functions, e.g. mosaic picture (performed by conventional circuits 7034–7038), posterization (performed by circuits 7040–7048), solarization (circuits 7042–7050), picture cropping (circuits 7052–7056) and color border, can also be performed under control of interface circuit 7014 independently on each of the three channels.

The video data stream in each of the three channels A, B and C is provided to a digital multiplexer 7058. Under control of the system computer and manager, multiplexer 7058 allows any of the three data streams to be switched to the output of the analog video processor for subsequent storage in a video field buffer to provide the set of source pixels for generation of the output pixels. In particular, the three video channel signals can be switched sequentially in order to write any one of the three signals into predetermined sections of the field buffer memory under control of the video source boundary coefficients generated by interface 7014. In this way, multiple picture sources may be displayed via a single picture channel. For example, if the "front" and "back" of a page in a "page turn" simulation are both to be displayed, video from two separate sources must be written to proper locations in the video field buffer memory.

Alternatively, one-quarter-size compressed video in each of the three separate channels (obtained from frame stores 7022–7026 as previously described) can be written into separate sections of the field buffer memory. The stored source pixels may then be retrieved and mapped to three visible faces of a cube which can then be manipulated in three dimensions.

Since three video signals are processed simultaneously, all these signals may be written independently to dedicated video frame buffers to allow processing of two full-color video signals plus a luminance signal which can be used as a key signal. Consequently, special effects, such as intersection of two full-sized live video pictures, may be produced using the multi-channel capability. The key signal may be made to "track" either or both of the video channels to produce many other effects in conjunction with a conventional production switcher.

Figure 8:
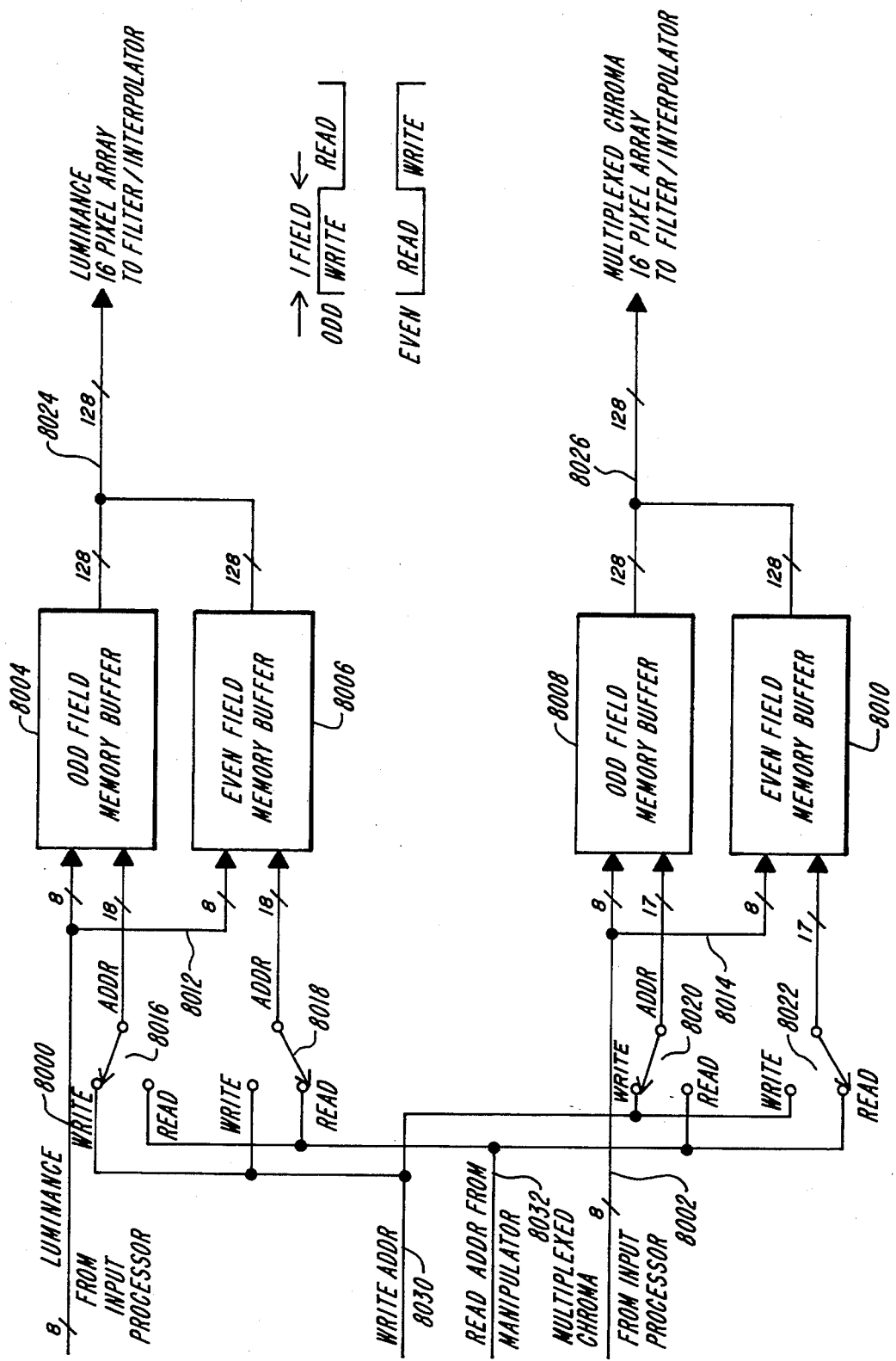
FIG. 8 is an electrical block schematic diagram of an overlapping read/write field store memory.
Figure 9:
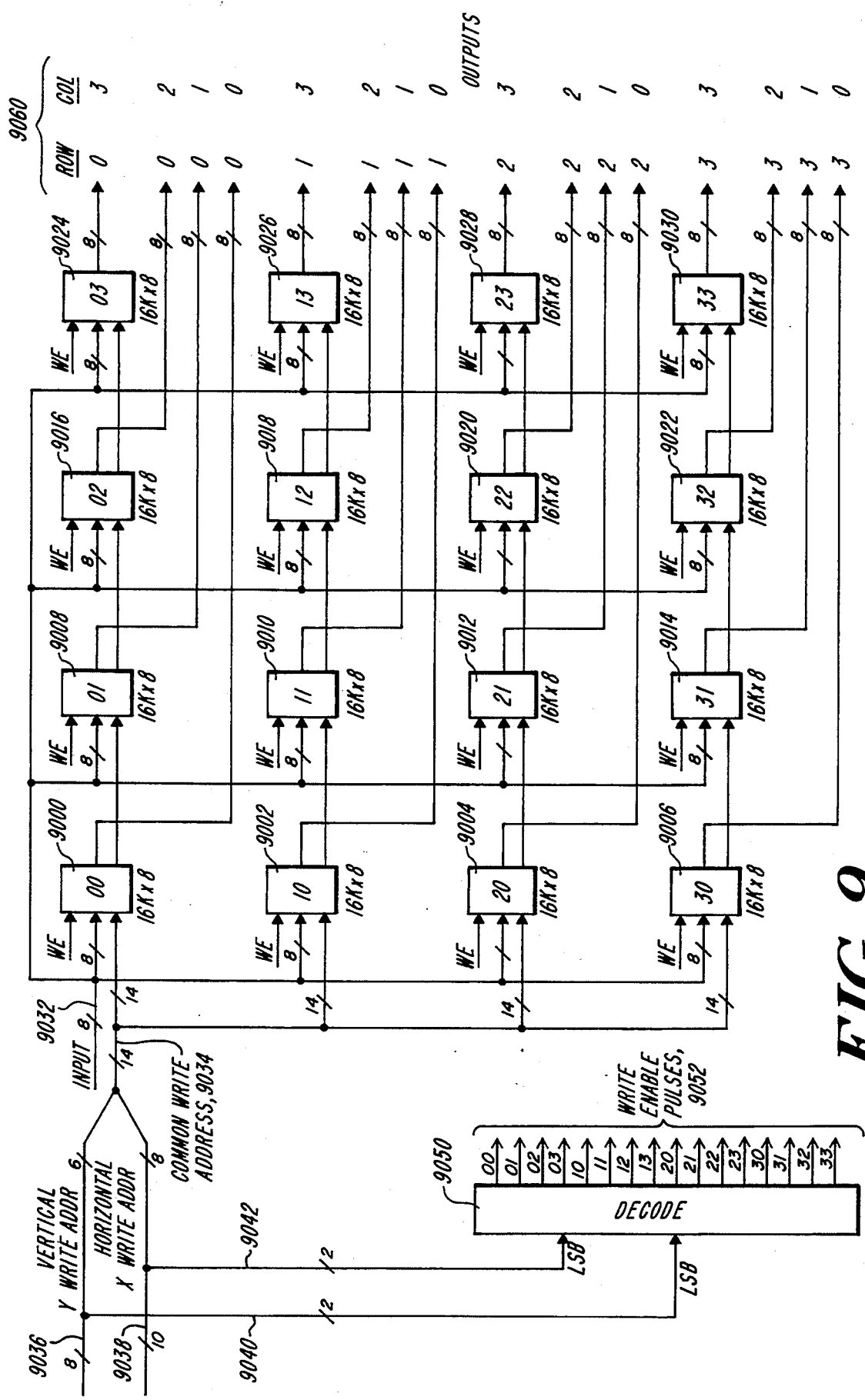
FIG. 9 is a more detailed electrical schematic block diagram of one field memory buffer in the field store memory of FIG. 8.
Figure 10:
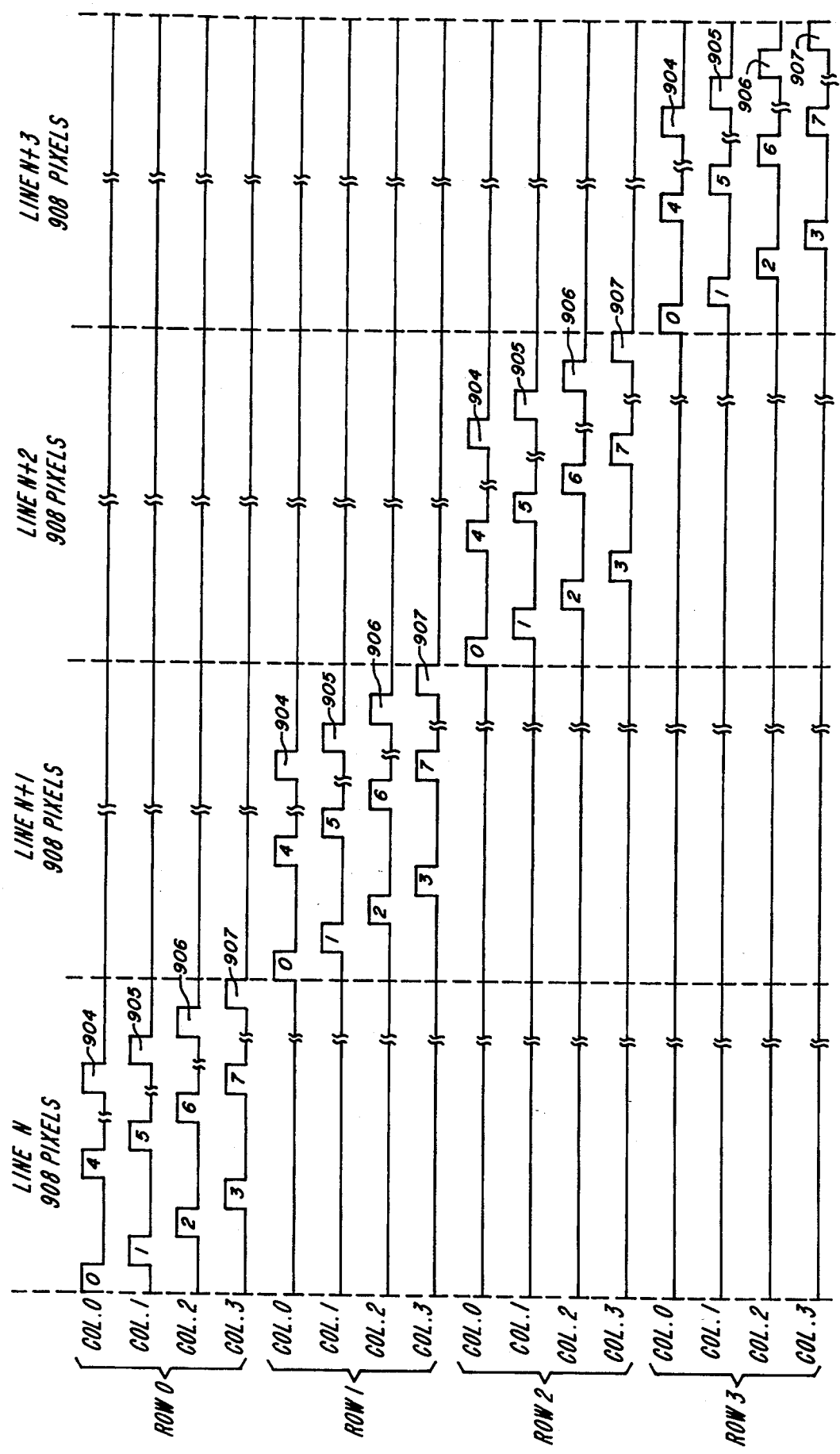
FIG. 10 is a timing chart of the field memory in the filter/interpolator circuit of FIGS. 8 and 9.

As previously mentioned, the multiplexed output of the analog video processor is provided to a field buffer memory which stores a set of input or source pixels that are subsequently used (as will be described in more detail) to generate each output pixel. FIGS. 8, 9 and 10 show the detailed arrangement of an illustrative field buffer memory.

More specifically, FIG. 8 shows a basic block schematic diagram of the complete buffer memory which consists of four separate memory units. Two memory units are used to store luminance information and two memory units are used to store the multiplexed chroma information. The luminance memory section and the chrominance memory section are each comprised of two memory units: an odd field memory unit and an even field memory unit. The incoming video data stream is written into one memory unit for one video field. During the next video field, the incoming data stream is written into the other memory. Consequently, during a video field while one memory unit is being written, the other one memory unit can be can be read, thereby avoiding the necessity of a dual port memory.

More particularly, the luminance field memory buffer is comprised of odd field memory unit 8004 and even field memory unit 8006. In a similar manner, the chrominance field memory buffer is comprised of an odd field memory unit 8008 and an even field memory unit 8010. The eight-bit luminance signal generated by the input processor is provided, via buses 8000 and 8012, to the inputs of the odd and even luminance field memory units 8004–8006 and the outputs of the memories are ORed together. In a similar manner, the eight-bit multiplexed chrominance signal is provided, via buses 8002 and 8014, to the inputs of odd and even chrominance memory units 8008 and 8010, respectively and the outputs of the memories are ORed together.

Luminance memory units 8004–8006 are both provided with an 18-bit address from either 18-bit write address bus 8030 or 18-bit read address bus 8032 (the 18-bit address consists of an 8-bit vertical address and a 10-bit horizontal address). Address information on write address bus 8030 is generated by counters whose initial count conditions are under system control.

As will be hereinafter described, the 18-bit read address is generated by a "manipulator" circuit which generates the address based on patch numbers and priority signals. Both write address bus 8030 and read address bus 8032 are provided to a pair of address switches, 8016 and 8018, which control the address provided to the luminance memory section. These switches are connected so that when write address signals on bus 8030 are provided to odd field memory unit 8004, read address signals are connected, via switch 8018, to even field memory unit 8006 and vice versa. Consequently, during one video field, write address information on bus 8030 is provided, via switch 8016, to the odd field memory unit causing it to sequentially store an entire field of eight-bit pixels of luminance information generated by the input processor. During the same video field, read address information from the manipulator circuit on bus 8032 is provided, via switch 8018, to the even field memory unit causing selected portions of the luminance information stored during the previous field to be read out. During the next video field, the positions of switches 8016 and 8018 are reversed causing the input information to be written into even field memory unit 8006 and read out of odd field memory unit 8004.

In a similar manner, multiplexed chroma information is written into and read from chroma memory units 8008 and 8010 under control of address signals on buses 8030 and 8032 provided via switches 8020 and 8022.

In response to each pixel address sequentially generated by the manipulator circuit, the luminance information read from memory units 8004 and 8006 and the chrominance information read from memory units 8008 and 8010 consists of a 4×4 pixel array (the array consists of 16 eight-bit pixels or a total of 128 bits) which surrounds the source pixel identified by the manipulator address. The 16-pixel array is provided via outputs 8024 and 8026 to a filter/interpolator circuit which combines the pixel values to generate a single output or target pixel in accordance with a predetermined filtering algorithm.

As will be hereinafter described in detail, in order to allow 16 pixels to be retrieved from memories 8004–8010 with the assertion of a single read address from the manipulator circuit, the input pixels are systematically written into the memories in a predetermined, cyclic pattern. In particular, the internal organization of each memory unit is shown in FIG. 9. Each unit (for example, odd field memory unit 8004) is comprised of sixteen memory circuits 9000–9030 arranged in a four-by-four array (arbitrarily arranged and designated as rows 0–3 and columns 0–3).

Pixel data to be written into the memory unit is received on 8-bit bus 9032 which is connected in parallel to the data inputs of all 16 memory circuits. Each memory also receives a 14-bit write address on address bus 9034 which is connected in parallel to the write address ports of all 16 memories 9000–9030 (generation of the read address information will be discussed in connection with FIG. 10).

The 14-bit write address consists of the six most significant bits of the eight-bit vertical write address provided on bus 9036 and the eight most significant bits of the 10-bit horizontal write address provided on bus 9038.

The two least significant bits of the vertical write address on bus 9040 and the two least significant bits of the horizontal write address on bus 9042 are provided to a write enable pulse decoding circuit 9050. This circuit decodes the four input bits on buses 9040 and 9042 and generates one of 16 write enable pulses, which is provided to one of the 16 memories 9000–9030. During a writing operation, the memories are sequentially pulsed by decoder 9050 so that each sequential pixel out of the incoming pixel pulse stream is written into a selected memory at the location specified by the 14-bit common address.

The timing of the write enable pulses is shown in FIG. 10. In particular, each video scan line consists of 908 pixels which are sequentially stored in four memories comprising a row of the four-by-four array. For each line (for example line "N"), the first pixel to arrive (pixel 0) is stored in memory 9000 or row 0, column 0; the second pixel (pixel 1) is stored in memory 9008 or row 0, column 1; the third pixel (pixel 2) is stored in memory 9016 or row 0, column 2; and the fourth pixel (pixel 3) is stored in memory 9004 or row 0, column 3. This writing cycle then repeats itself with the fifth pixel (pixel 4) being stored in memory 9000, the sixth pixel (pixel 5) in memory 9008 and the seventh pixel (pixel 6) in memory 9016 and the eighth pixel (pixel 7) in memory 9024. The writing pattern repeats until the entire 908 pixels of the scan line have been stored in memories 9000, 9008, 9016 and 9024.

The next video line (line N+1) of 908 pixels is stored in a similar manner in memories 9002, 9010, 9018 and 9026. Similarly, the third line (line N+2) is stored in memories 9004, 9012, 9020 and 9028 and the fourth line is stored in memories 9006, 9014, 9022 and 9030. This cycle then repeats itself with the next line of pixels being stored in the first row of memories (memories 9000-9024) the next line being stored in the next row of memories (memories 9002-9026), etc. This cyclic storage pattern allows a 4×4 pixel array to be read from the memory unit with each read address generated by the manipulator circuit.

More particularly, as previously described, the 16 memory circuit array is read by means of an 18-bit read address generated by the manipulator circuit in a manner to be described in detail below. The connection of the read address signals to the 16 memory circuit array is shown in detail in FIG. 11 (memories 1100-1130 correspond to memories 9000-9030). The 18-bit read address signal consists of a 10-bit horizontal read address signal (bits X0-X9) which is provided to the memory array via bus 1174 and an eight-bit vertical read address (bits Y0-Y7) provided on bus 1176. As will hereinafter be described, since the pixels are stored in a fixed, cyclic pattern in memories 1100-1130, the address signals provided by the manipulator circuit on buses 1174 and 1176 must be internally modified in order to "move" the 16 pixel array by one pixel in the horizontal direction or one scan line in the vertical direction in response to an increment in the least significant bit of the manipulator address. This modification is necessary so that the 16-pixel array can be centered over any particular pixel in the memory to generate the required output target pixel.

As shown by Tables 1 and 2, this modification is done by selectively adding the least significant bits of both the horizontal and vertical address to the remainder of the address in a predetermined pattern.

TABLE 1

Alteration of horizontal read addresses provided to each column of memory circuits

| To move array to the right by: | Add To Col 0 | Add To Col 1 | Add To Col 2 | Add To Col 3 |
|---|---|---|---|---|
| 0 pixels | 0 | 0 | 0 | 0 |
| 1 pixel | 1 | 0 | 0 | 0 |
| 2 pixels | 1 | 1 | 0 | 0 |
| 3 pixels | 1 | 1 | 1 | 0 |

TABLE 2

Alteration of vertical read addresses provided to each row of memory circuits

| To move array down by: | Add To Row 0 | Add To Row 1 | Add To Row 2 | Add To Row 3 |
|---|---|---|---|---|
| 0 lines | 0 | 0 | 0 | 0 |
| 1 lines | 1 | 0 | 0 | 0 |
| 2 lines | 1 | 1 | 0 | 0 |
| 3 lines | 1 | 1 | 1 | 0 |

TABLE 3

Pixel nos. retrieved from each column of memory circuits in a given row as a function of X0,X1

| X0,X1 | Col 0 | Col 1 | Col 2 | Col 3 |
|---|---|---|---|---|
| 0,0 | 0 | 1 | 2 | 3 |
| 0,1 | 4 | 1 | 2 | 3 |
| 1,0 | 4 | 5 | 2 | 3 |

TABLE 3-continued

Pixel nos. retrieved from each column of memory circuits in a given row as a function of X0,X1

| X0,X1 | Col 0 | Col 1 | Col 2 | Col 3 |
|---|---|---|---|---|
| 1,1 | 4 | 5 | 6 | 3 |

More particularly, Table 1 shows the alteration of a horizontal addresses in each column to locate a 16-pixel group with a single pixel resolution. The alteration of the column address is controlled by the least significant bits X0 an X1 which are used to specify the pixel distance that the array is moved.

As shown in Table 1, if the incremental movement is zero (the least significant bits X1 and X0 are both zero), then the address contained in the eight most significant bits (X2-X9) is used to directly access each column of the memory array. Alternatively, if bit X0 is a one and bit X1 is a zero indicating a move to the right of the array by one pixel, then the address provided to the first column of memory circuits is increased by one while the remaining columns utilize the most significant bits X2-X9 as the read address. Similar address modifications are made to the column addresses for two and three pixel movements.

The effect of adding the least significant bits to the most significant bits of the address is shown in Table 3. This table illustrates the pixel number of pixels at the start of a video line which are retrieved from the first array row in response to different combinations of bits X0 and X1. As can be seen in Table 3, the array is effectively shifted to the right by one pixel in each case, although the output pixel "order" is different with each array move. A change in output pixel order is accommodated by providing the least significant bits X0 and X1 to the following filter/interpolator stage as will hereinafter be explained causing that stage to properly interpret the output pixels to perform the desired interpolation and filtering functions.

Figure 11:
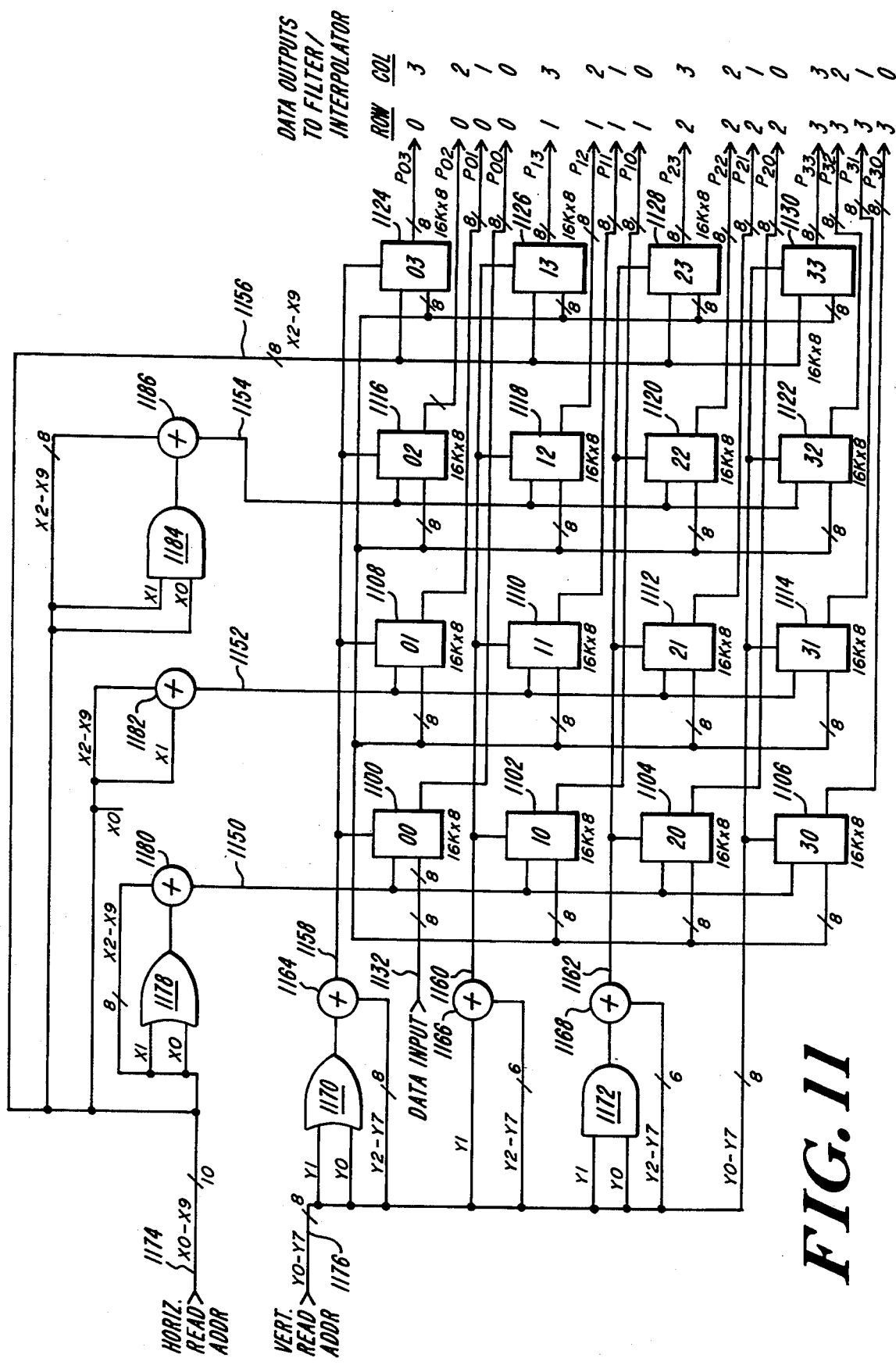
FIG. 11 is an electrical block schematic diagram of the read/write address circuitry for the field memory buffer of FIG. 9.

The addition of least significant bits to the address most significant bits, as shown in Tables 1 and 2, is accomplished by means of the logic circuitry shown in FIG. 11. In particular, the 10 horizontal read address bits (X0-X9) on bus 1174 are provided, via buses 1150-1156, to the four columns of the four-by-four memory circuit array comprised of memory circuits 1100-1130. In particular, the first column of the memory array, consisting of memory devices 1100-1106, is driven by bus 1150 which is, in turn, driven by the output of digital adder 1180. Adder 1180 is provided with two inputs: the eight most significant bits of the horizontal read address (bits X2-X9) and the output of ORgate 1178. ORgate 1178 receives as its inputs the least significant bits X0 and X1. Consequently, the address of the first column of memory circuits will be increased by one if either or both of bits X0 and X1 are "ones".

Similarly, the address on address bus 1152, which provides the horizontal address to the second column of memory devices 1108-1114, is generated by the output of adder circuit 1182 which adds the bit X1 to the most significant bits X2-X9. Consequently, the second column address will be increased by one if bit X1 is a "one".

The address on address bus 1154, which drives memory devices 1116-1122 is generated by the output of adder 1186 which, in turn, receives the most significant bits X2-X9 as one input and adds them to the output of AND gate 1184 which receives, in turn, as inputs the least significant bits X0 and X1. Consequently, the third column address will be increased by one if both bits X0 and X1 are "one".

Finally, the most significant bits X2-X9 are provided directly as an address to the fourth memory column consisting of devices 1124-1130.

In a similar manner, the vertical read addresses on bus 1176 are provided to the four rows of the pixel memory array. In particular, the first row of memory devices (consisting of devices 1100, 1108, 1116 and 1124) is driven by six-bit memory bus 1158 generated by digital adder 1164 which adds the most significant six bits (Y2-Y7) of the vertical read address to the output of ORgate 1170 which is driven by the least significant bits Y0 and Y1.

The next row of memory devices is driven by address bus 1160, which is, in turn, generated by the output of digital adder 1166. Adder 1166 receives, as one input, the most significant six bits of the Y address (Y2-Y7) and as the other input, the least significant bit Y1. The third row of memory devices (consisting of devices 1104, 1112, 1120, 1128) are driven by address bus 1162 which is, in turn, generated by the output of digital adder 1168. As with the X address buses, this latter adder receives the upper six bits of the Y address (bits Y2-Y7). The other input of adder 1168 is the output of AND gate 1172 which receives as its input the least significant bits Y0 and Y1. As with the X addresses, the six Y address bits Y2-Y7 are provided through the last memory device row (consisting of devices 1106, 1114, 1122 and 1130). The outputs of the memory array are 16 pixel values ($P_{00}$-$P_{33}$) which are forwarded to a pixel interpolator to generate the final target pixel value.

Figure 12:
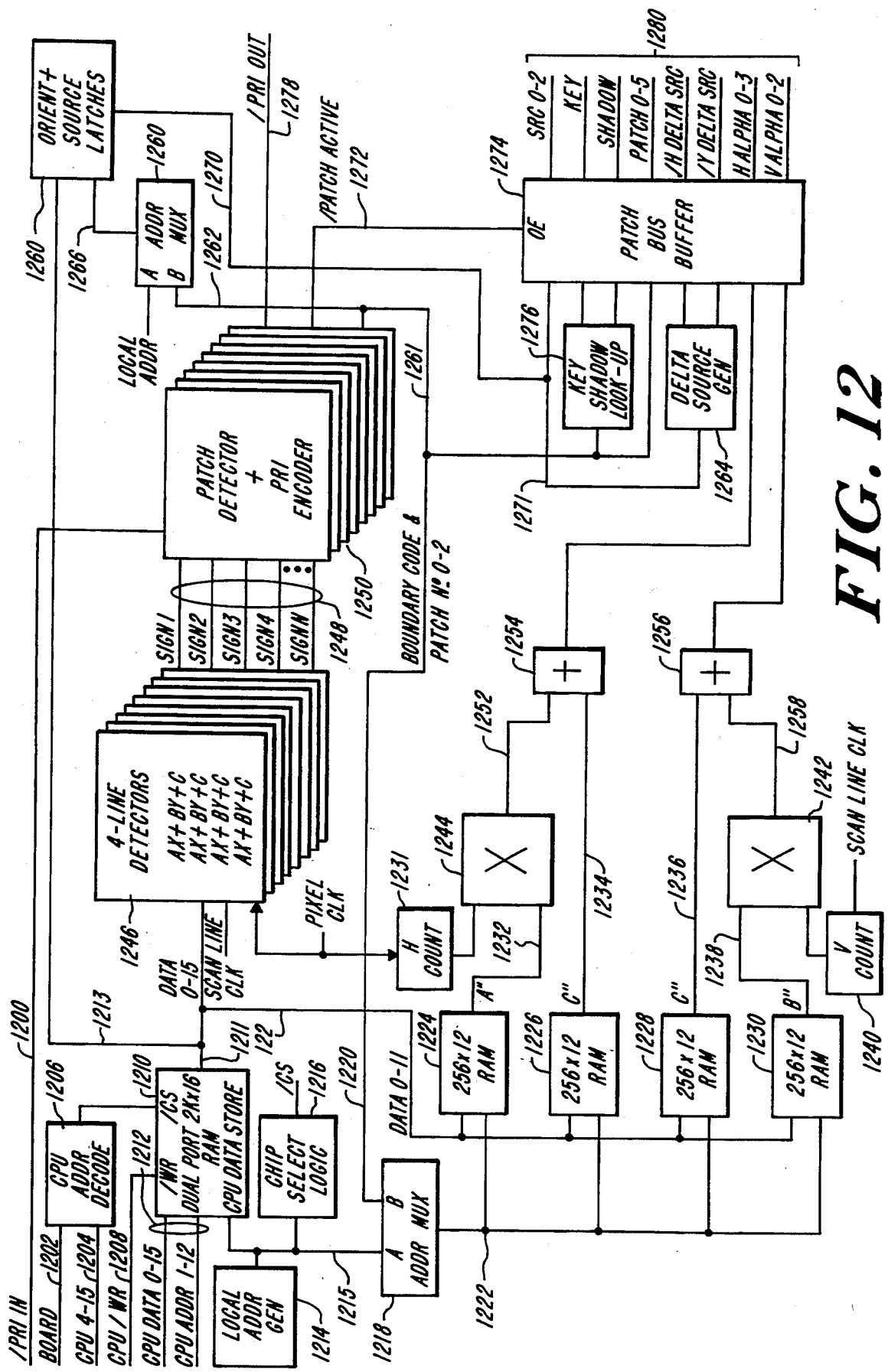
FIG. 12 is an electrical schematic block diagram of a patch detector circuit.

The horizontal and vertical read addresses which retrieve stored source pixel information are generated by the patch detector and manipulator circuits. The schematic block diagram of FIG. 12 illustrates an illustrative embodiment of the circuitry which performs the patch detection process. As previously mentioned, during each video field time, coefficients are calculated which determine the boundary lines of each patch. The coefficient data is stored and used in the patch detection process which takes place during the next video field time. More particularly, the coefficient data which specifies the boundaries for each of patches used in the system is received via system bus 1212 from the system computer and manager (illustrated in FIG. 4) and is stored in dual-port RAM memory 1210 for later use. RAM 1210 is enabled by address decoding circuit 1206 which responds to board number and CPU select control signals on system control buses 1202 and 1204, respectively. Writing is controlled by the write enable signal CPU /Wr on lead 1208.

During each video field blanking interval, data stored in RAM 1210 during the previous video field interval is retrieved and latched into each of a plurality of patch boundary detectors 1246. In addition, the 12 least significant bits (0-11) of the coefficient values are provided via bus 1221 to line coefficient stores 1224-1230. This latter information will be used (as will hereinafter be described) to generate fractional boundary information when the target pixel location crosses a patch boundary.

The patch data is read out of RAM 1210 on output buses 1211 and 1221 and into detectors 1246 and stores 1224-1230 sequentially under control of sequential address signals generated by local address generator 1214. The address signals produced by generator 1214 are provided to the address inputs of RAM memory 1210 via bus 1215 and are also provided to RAM stores 1224-1230 via address mutliplexer 1218 and bus 1222. A chip select logic circuit 1216 decodes the address signals on bus 1215 and generates a chip select signal, /Cs, which is applied to memory 1210 to enable it.

A patch boundary detector circuit 1246 is provided for each patch used in the system. Illustratively, there may be 32 to 64 patches used in the system. Each of the boundary detectors 1246 is a hardware computation circuit which simultaneously evaluates four expressions of the form:

$$Ax_t + By_t + C \qquad (7)$$

where, A, B, C are patch boundary coefficients retrieved from RAM memory 1210 for one selected patch, and $x_t$ and $y_t$ are horizontal pixel numbers ($0 \leq x_t \leq 909$) and vertical scan line numbers ($0 \leq y_t \leq 263$), respectively, which specify the target pixel location in the output display. The four expressions must be re-evaluated within each pixel time (approximately 70 ns.) but this is not a problem since the circuits are comprised of hardware multipliers and adders.

Figure 18:
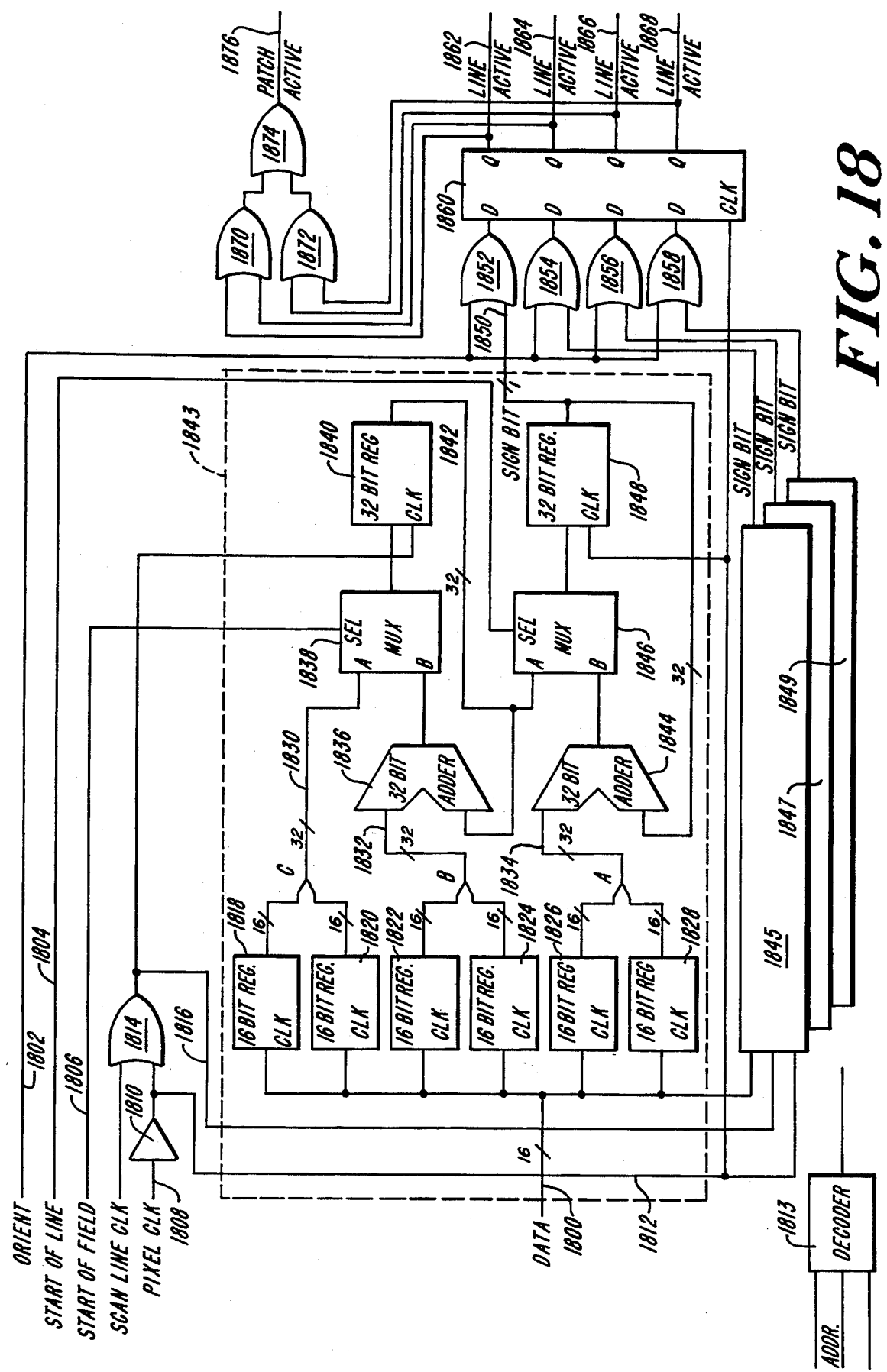
FIG. 18 is a detailed electrical block schematic diagram of a patch boundary line detector.

FIG. 18 shows a more detailed block diagram of a patch boundary detector circuit. The boundary detector circuit actually consists of a plurality of boundary detector circuits, each of which evaluates expression (7) for one patch boundary. As mentioned previously, illustratively, each patch is allowed up to four boundaries. If each patch is allowed more than four boundaries. FIG. 18 shows the four boundary detector circuits, 1843-1849, illustratively associated with one patch. As each of the four boundary detectors is identical, for clarity, only boundary detector 1843 is shown in detail.

Detector 1843 receives coefficient data over 16-bit data bus 1800 from the system computer as previously described. This data is latched into a plurality of registers 1818-1828 which store the information for a field interval until the information is needed during the next subsequent field interval. Storage of the data in registers 1818-1828 is under control of a decoder circuit 1813 which receives address information from the system address bus and control information (including a chip select signal, /Cs, and a write signal, /Wr). Under control of the system control signals, decoder chip 1813 generates twenty-four chip select signals, /Cs0-/Cs23. The chip select signals are applied to registers 1818-1828 to enable them at the proper time to receive information from bus 1800. Each of the coefficients (A, B, and C) for the patch boundary is comprised of a 32-bit number and, thus, the information must be transferred in two portions over 16-bit data bus 1800 and latched into the appropriate registers. Registers 1818 and 1820 store the information for coefficient C whereas registers 1822 and 1824 store coefficient B information. Finally, registers 1826 and 1828 store the coefficient A information.

The output of registers 1818 and 1820 (comprising the 32-bit coefficient C information) is provided, via bus 1830, to the A-input of data multiplexer 1838. This multiplexer is controlled by a "start of field" signal so that at the beginning of each video field, multiplexer 1838 is controlled to apply the C coefficient information to a 32-bit register 1840. The start of field, scan line clock (which operates at the scan line rate) and start of line timing signals are derived from reference video information by the output video processor circuitry as will be hereinafter described. The C coefficient information is clocked into register 1840 under control of a scan line clock signal which is provided, via OR gate 1814, of the clock input of register 1840.

Output 1842 of 32-bit register 1840 is provided to one input of 32-bit adder 1836. The other input of adder 1836 receives the B coefficient information on bus 1832 from registers 1822 and 1824. The sum of the output of register 1840 and the B coefficient on bus 1832 is applied to the B input of multiplexer 1838. Immediately after the start of a video field, the start of field signal on lead 1806 becomes low, causing the B input of multiplexer 1838 to be connected to register 1840. Since register 1840 is clocked at the start of each scan line by the scan line clock, as the target pixel line position ($y_t$) increases with each scan line, the B coefficient information is added to the sum in register 1840 producing the expression $By_t+C$ which appears at the output of register 1840.

The sum $By_t+C$ is applied, via bus 1842, to the upper input of multiplexer 1846. At the beginning of each scan line, the sum $By_t+C$ is clocked into 32-bit register 1848 through multiplexer 1846. Register 1848 is, in turn, connected to one input of 32-bit adder 1844 which receives the A coefficient information from registers 1826 and 1828, via bus 1834. Register 1848 is clocked by the pixel clock, via lead 1812 and buffer amplifier 1810. Thus, as the target pixel position ($x_t$) advances, the coefficient A is repeatedly added to the initial sum $By_t+C$ producing the final expression $Ax_t+By_t+C$ in register 1848.

The sign bit of register 1848 appears on lead 1850 and is used to indicate whether the target pixel position ($x_t$, $y_t$) is either to the right of the patch boundary (expression (7) is negative), to the left of the boundary (expression (7) is positive), or on the boundary (expression (7) is zero). In the case where expression (7) is positive or zero the sign bit will be zero; when expression (7) is negative the sign bit will be "one". The sign bit is provided to one input of exclusive or gate 1852. A similar sign bit is developed by circuits 1845-1849 and applied to exclusive-OR gates 1854-1858, respectively.

Each of exclusive-OR gates 1852-1858 receive the Orient signal at their other input, via lead 1802. As previously mentioned, if a patch has been "flipped over" during manipulations its orientation will be clockwise causing expression (7) for each boundary to be negative even though the target pixel is within the patch. If this type of patch manipulation occurs, the system computer applies a "high" signal to the orientation lead 1802 which inverts the sign bits so that the condition in which the scan point is within a patch is always indicated by all "zero" sign bits. The outputs of exclusive-OR gates 1852-1858 are applied to a latch circuit 1860 which is clocked by the pixel clock. The outputs of latch circuit 1860 are four leads 1862-1868 carrying the /line active signals. Thus, the condition where the target point is within a patch is indicated by all of the /line active signals 1862-1868 being "low". The signals on leads 1862-1868 are provided to OR gates 1872-1874 to produce the /patch active signal 1876 which is "low" if the target pixel ($x_t$, $y_t$) falls within the patch.

Returning to FIG. 12 the /line active signals of the four evaluated results are provided, via leads 1248, to one of patch detector and priority decoder circuits 1250. A patch detector and priority decoder circuit is provided for each boundary detector circuit.

Each patch detector and priority decoder circuit compares the four /line active signals generated by the boundary detector circuit on leads 1248. If all signs are "zero", then the target pixel location ($x_t,y_t$) is within the boundaries of the patch being evaluated by the corresponding boundary detector. Each of the patch detector circuits is assigned a unique patch number. Consequently, the patch detector which detects that the target pixel is with the corresponding patch boundaries generates the corresponding patch number on output lead 1261 which is connected in parallel to each of detectors 1250.

As previously mentioned, it is possible that the target pixel can be located within more than one patch. Since only one patch can be visible at a target pixel location $x_t,y_t$, the patch number of the "visible" patch is determined by a "depth" or priority value (/Pri in) furnished to detectors 1250 by the system computer over bus 1200. Each patch detector is preassigned a priority value which is compared to the priority value generated by the system computer. Patch detectors associated with patches that lie "behind" the "visible" patch (and, therefore, have a "lower" assigned priority value than the system generated priority value) are disabled so that only one patch detector produces a patch number for each target pixel location.

Figure 19:
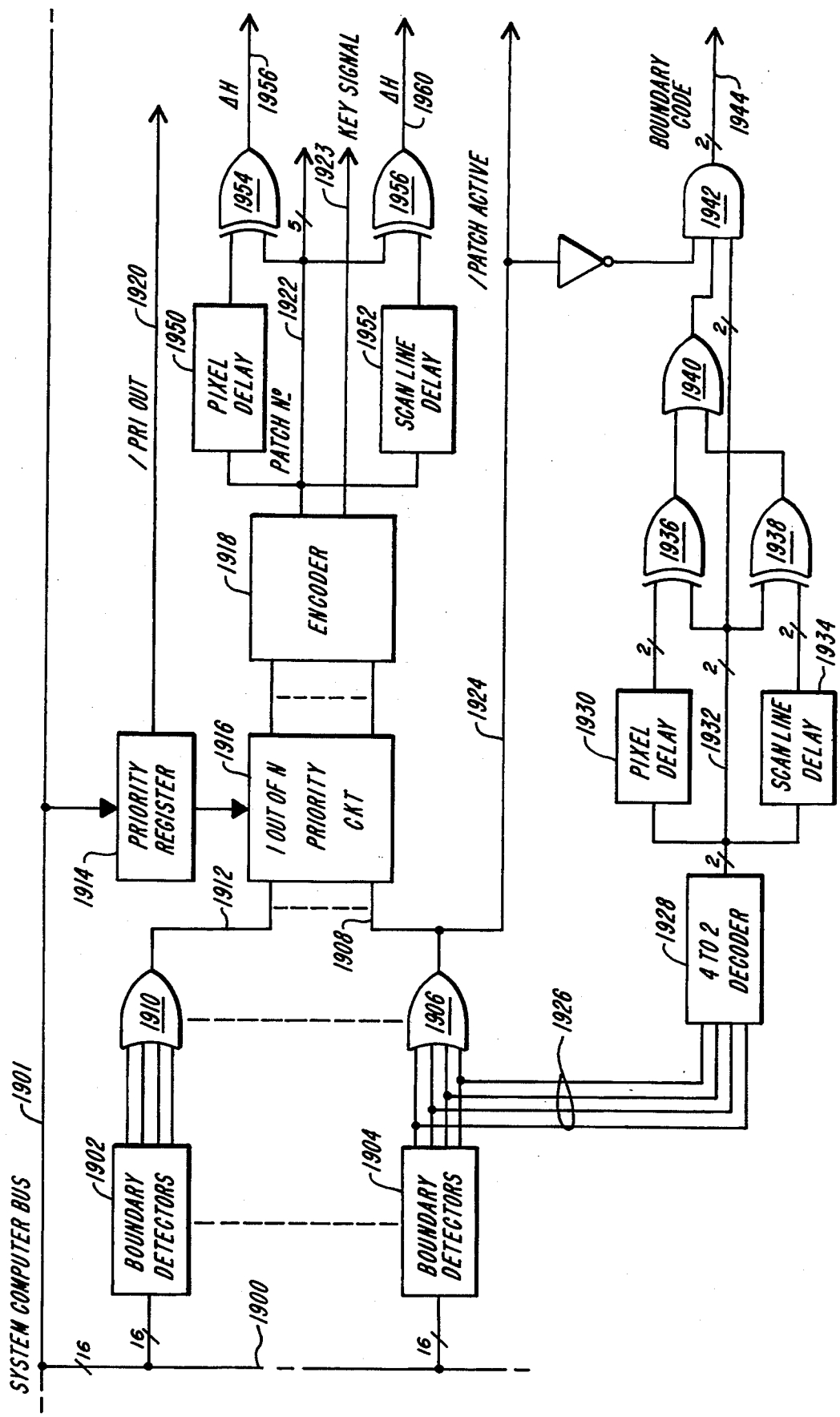
FIG. 19 is a detailed electrical block schematic diagram of the patch detector and priority circuit.

FIG. 19 shows a more detailed block diagram of the patch detector and priority circuit. This circuit detects when a patch is active and, if there is more than one patch active, selects the patch with the highest priority. In particular, the circuit is controlled by signals on system computer bus 1901. As previously mentioned, these signals are provided to the boundary detectors 1902-1904, one of which is provided for each patch. As the circuitry for each patch detector is identical, only one patch detector will be described in detail.

The four /line active signals generated by each boundary detector (previously described in connection with FIG. 18) are provided to an OR gate 1906 which produces a "low" signal if all /line active signals are "low" indicating that the target pixel is included in the corresponding patch (gate 1906 corresponds to gates 1870-1874 in FIG. 18. It is duplicated here for clarity).

The "low" signal on gate output 1908 (corresponding to the /patch active signal) is applied to a 1 out of N priority circuit 1916 (where "N" is the total number of patches, illustratively 64). Priority circuit 1916 is controlled by a priority register 1914 which is, in turn, loaded with priority information (signal /Pri in) from the system computer bus 1901. The priority information stored in register 1914 (/Pri out) is provided to the remainder of the circuit via bus 1920. In addition, the priority information in register 1914 controls circuit 1916 to select the highest priority /patch active signal out of all the patches which produce a /patch active signal. This signal appears on one of the N leads supplied to an encoder 1918 which encodes the patch number into a binary coded /Patch # signal on bus 1922. If no patches are active, encoder generates a single-bit key signal on lead 1923. This key signal is later used to combine the video signal with another "background" signal.

In FIG. 12, the patch number and the key signal on bus 1261 (corresponds to buses 1922 and 1923 in FIG. 19) is provided to key and shadow look-up circuit 1276, patch bus buffer 1274, address multiplexer 1218 (via bus 1220) and address multiplexer 1260 (via bus 1262).

In response, key and shadow look-up circuit 1276 generates a "shadow" signal when a patch (or group of patches) is designated as a "shadow" patch. The shadow signal is also provided to patch bus buffer 1274. The key signal is passed through buffer 1274 to the /Key output.

In addition to the patch coefficient information, codes indicating the video source and patch orientation are retrieved from RAM 1210 on bus 1213 during each video field. As previously mentioned, the incoming video stream can be composed of one of three video sources which is selected by the input video processor. The identity of the selected source must be provided to the edge interpolation circuits (described in detail below) so that an acceptable image transition can be generated at picture boundaries. Consequently, the code indicating the video source is latched into orient and source latches 1268 under control of the local address generated by address generator 1214 as the coefficient data is being read out of RAM 1210. Also, in order to provide for proper edge interpolation, the "orientation" of each patch is determined by the system computer since it is possible that one or more of the patches may have been "flipped over" during 3D patch manipulations. The orientation information is also retrieved from RAM memory 1210 and stored in latches 1268 under control of the local address information. After the target pixel has been located in a patch the orientation of that patch and the video source information is provided to patch bus buffer 1274 via bus 1270.

As long as each target pixel is within the boundaries of a patch, the vertical and horizontal positions of the pixel need only be computed with single pixel resolution to provide for subsequent interpolation. However, when the boundary of any patch is crossed (a given pixel is within the patch, but the next subsequent pixel is outside the patch) in either horizontal or vertical direction, as indicated by a patch changing from active to inactive, it is necessary to determine the position of that boundary with a precision greater than a single pixel spacing so that subsequent pixel value edge interpolations will be acceptably accurate.

Consequently, as shown in FIG. 19, circuitry is provided to determine the direction of the movement and to identify of the boundary that is crossed. To determine the direction of movement (vertical and/or horizontal), the present patch number is compared to the previous patch numbers one scan line earlier and one pixel earlier.

In particular, the current patch number on bus 1922 is applied to a pixel delay circuit 1950 and a scan line delay circuit 1952. These latter circuits generate the required previous patch numbers. The previous patch numbers are exclusive Ored with the current patch number by exclusive OR gates 1954 and 1956. Thus a movement in the horizontal direction causes gate 1954 to generate a "high" $\Delta H$ signal on output lead 1958, while a movement in the vertical direction causes gate 1956 to generate a "high" $\Delta V$ signal on output lead 1960. These signals are used to control an edge interpolator which processes the signal at a later stage as will be described in detail below.

The identity of the boundary line which as been crossed is determined by comparing the status of the /line active signals in the active patch to their status one scan line earlier and one pixel earlier. More specifically, the four /line active signals on leads 1926 are applied to a four-to-two encoder 1928 which encodes the signals as a two-bit binary signal. The two-bit binary signals are applied to a pixel delay 1930 and a scan line delay 1934. Pixel delay 1930 delays the two-bit code by a time delay equal to one pixel duration.

Alternatively, scan line delay 1934 delays the two-bit code by a time duration equal to one scan line. The delayed output of pixel delay 1930 is applied to exclusive OR circuit 1936 which exclusive ORs the output with the two-bit code generated by encoder 1928 on lead 1932. In a similar manner, the output of scan line delay 1934 is applied to exclusive OR circuit 1938 and exclusive ORed with the output encoder 1928 on lead 1932. Thus, when the boundary detector indicates that a boundary has been crossed in a horizontal direction, the inputs to exclusive OR gate 1936, which represent the current boundary status and the boundary status one pixel time earlier, will be different causing gate 1936 to produce a high output. In a similar manner, if the state of the boundary detector changes relative to its scan line earlier, gate 1938 will produce a high output. In either case, the high outputs are ORed together by OR gate 1940 and applied to AND gate 1942 allowing the boundary code generated by encoder 1928 to pass through gate 1942 and appear as the boundary code output 1944.

The combination of boundary code and the active patch number is then used to address a memory in which all boundary line parameters have been stored for the duration of one video field's time. Specifically, referring to FIG. 12, the boundary coefficients which represent the identified boundary line are retrieved from RAM stores 1224–1230. In particular, the three least significant bits (bits 0–2) of the patch number and the boundary code on bus 1261 generated by patch detector circuits 1250 are provided, via bus 1220, to address multiplexer 1218. Under control of control circuitry (not shown), multiplexer 1218 applies the patch number bits as an address to RAM memories 1224–1230 over bus 1222 to retrieve four coefficients, (A", C", C' and B') on buses 1232–1238, respectively.

The coefficient A" on bus 1232 is multiplied by the pixel horizontal position. The horizontal pixel values and vertical scan line numerical values are sequentially generated from local counters 1231 and 1240, respectively. Counter 1231 is clocked by the system pixel clock and reset by the scan line reset signal. Counter 1240 is clocked by the system scan line clock and reset by the field rate signal. The horizontal pixel value is multiplied by the coefficient A" by hardware multiplier 1244. The product A"$x_t$ on bus 1252 is added to the coefficient C" by adder 1254. Consequently, for a boundary crossing in the vertical direction, an expression:

$$y'' = A'' x_t + C'' \qquad (8)$$

is evaluated which generates a fractional value, y", of the vertical position $y_t$ which is provided to the patch bus buffer 1274 and subsequently sent to a vertical direction edge interpolator which follows in the system.

The coefficient B' on bus 1238 is multiplied by the pixel vertical position (value $y_t$ generated by counter 1240) by hardware multiplier 1242. The product B'$y_t$ on bus 1258 is added to the coefficient C' by adder 1256. Consequently, for a boundary crossing in the horizontal direction, an expression:

$$x'' = B' y_t + C \quad (9)$$

is evaluated which generates the fractional value, x", of the horizontal position $x_t$ which is provided to patch bus buffer 1274 and subsequently sent to a horizontal direction edge interpolator which follows in the system.

For simultaneous crossings in both vertical and horizontal directions, both fractional values y" and x" are sent simultaneously to the respective interpolators.

In the case of boundary crossing, it is also necessary to more carefully specify the video source at the boundary. In this case, the source information stored in orientation and source latches 1268 is provided to Delta Source Generator 1264 via bus 1270 and bus 1271. Delta Source Generator determines the exact video source identity at the patch boundary and generates two output signals (/H Delta Src, /V Delta Src) which are provided to patch bus buffer 1274.

The outputs 1280 of patch bus buffer 1274 consisting of video source code (Src), the key signal (/Key), the shadow signal (/Shadow), the patch number (/Patch), the delta source signals (/H Delta Src, /V Delta Src) and the fractional boundary numbers (H alpha and V alpha) are stored in the buffer and transferred to the following circuits when a patch has been detected.

Figure 13:
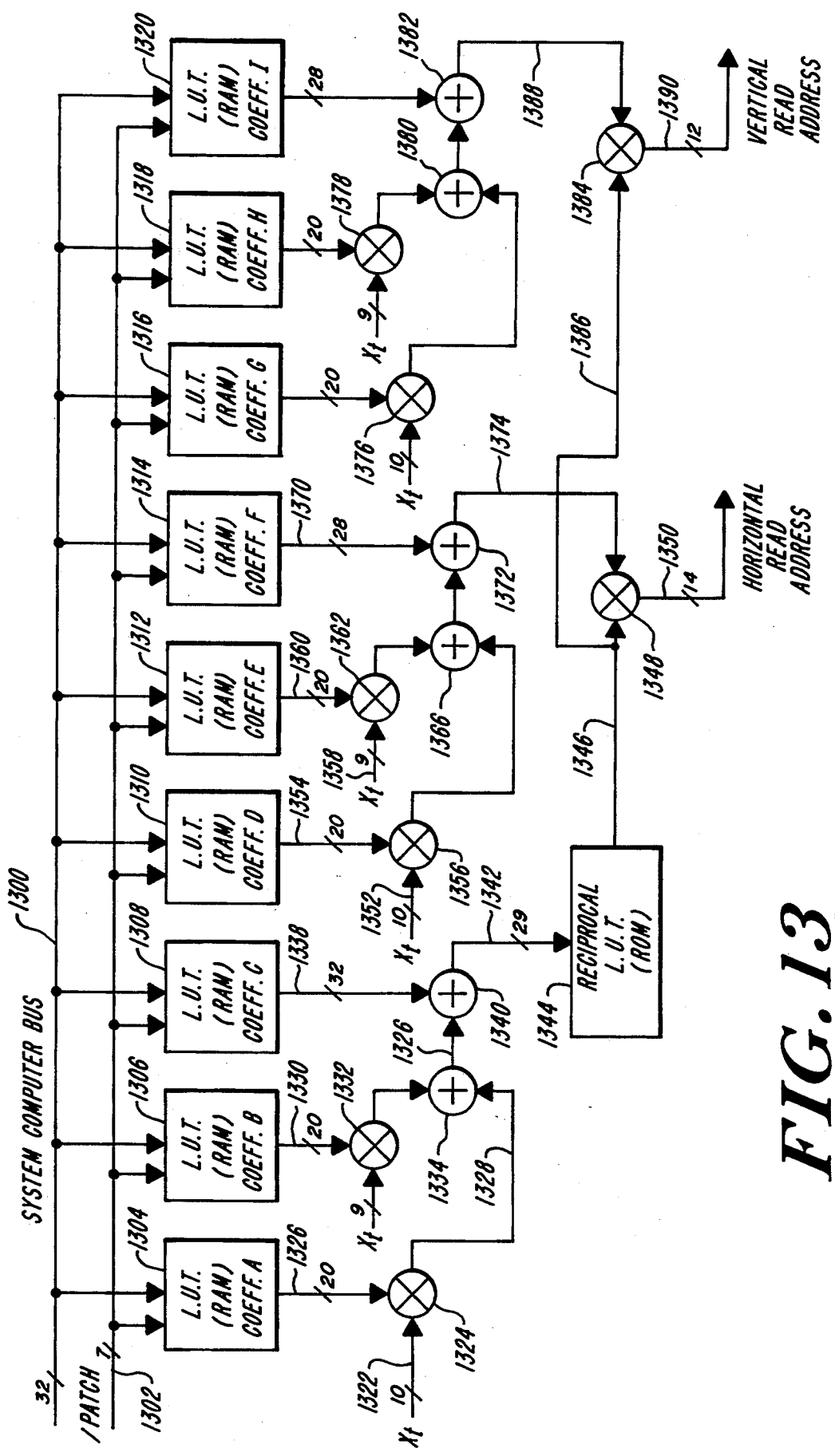
FIG. 13 is an electrical block schematic diagram of a manipulator circuit.

In particular, the patch number (/Patch) is forwarded to the manipulator circuit shown in more detail in FIG. 13. The function of the manipulator circuit is to generate a memory read address which is used to retrieve a 16 pixel array from the video field buffer memory previously described and shown in FIGS. 8-11. The read address is generated by separately generating a horizontal read address and a vertical read address. The horizontal read address and the vertical read address are then combined to generate the final read address. The horizontal read address and the vertical read address are, in turn, generated by evaluating expressions of the form:

$$\text{Horizontal Address} = \frac{D_n x_t + E_n y_t + F_n}{A_n x_t + B_n y_t + C_n} \quad (10)$$

$$\text{Vertical Address} = \frac{G_n x_t + H_n y_t + I_n}{A_n x_t + B_n y_t = C_n} \quad (11)$$

where $x_t$, $y_t$ are the target pixel horizontal and vertical position numbers generated by counters 1231 and 1240 (FIG. 12), respectively and $A_n$, $B_n$, $C_n$, $D_n$, $E_n$, $F_n$, $G_n$, $H_n$, $I_n$ are inverse coefficients for the nth patch number. As previously mentioned, the coefficients $A_n$–$I_n$ are obtained by inverting the transformation matrices which determine the patch 3D transformations and their values depend upon the patch size, translation, rotation and perspective which have been requested via the user control panel. However, in accordance with the invention, since each of the patches is flat, the inversions are not multiple-order and can be performed in real time by the system computer during the previous video field time.

More particularly, at the start of each video field interval, look-up-table RAMS (L.U.T RAMs) 1304–1320 are each loaded over system bus 1300 with a set of coefficients ($A_1$–$A_n$ are loaded into RAM 1304; $B_1$–$B_n$ are loaded into RAM 1306, etc.) for each of the n patches being processed in the System. Illustratively, for a 32 patch system, 288 coefficients would be loaded into RAMS 1304–1318.

Each of RAMs 1304–1320 then serves as a look-up table which receives the /Patch number signal from the patch detector circuit (FIG. 12) from bus 1302 as an input address in order to retrieve the coefficient corresponding to the detected patch number. The nine coefficients ($A_n$, $B_n$, $C_n$, $D_n$, $E_n$, $F_n$, $G_n$, $H_n$, $I_n$) retrieved from RAM memories 1304–1320 are then loaded into various multipliers and adders to compute the horizontal and vertical read addresses.

More particularly, the denominator of the horizontal and vertical read address expressions is generated by multipliers 1324 and 1332 and adders 1334 and 1340. The horizontal target pixel position number $x_t$ on bus 1322 is provided to hardware multiplier 1324. Multiplier 1324 receives as its other input the 20-bit coefficient ($A_n$) retrieved from look-up table RAM 1304 and provided on bus 1326 to multiplier 1324. The product $A_n x_t$ on bus 1328 is provided to one input of adder 1334. The other input of adder 1334 receives the product $B_n y_t$ developed by multiplier 1332. Multiplier 1332, in turn, receives a nine-bit target pixel vertical position number $y_t$ from counter 1240 (FIG. 12) and a 20-bit coefficient number ($B_n$), via bus 1330, from look-up table RAM 1306. The sum $A_n x_t + B_n y_t$ on bus 1336 is provided to adder 1340 which adds a 32-bit coefficient ($C_n$) on bus 1338 obtained from look-up table RAM 1308.

The output 1342 of adder 1340 is a 29-bit signal $A_n x_t + B_n y_t + C_n$. This number is provided as the address input to a reciprocal look-up table ROM 1344 which generates the reciprocal of the number on bus 1346 and provides it to multipliers 1348 and 1384.

The numerator of the horizontal read address expression is generated by multipliers 1356 and 1362 and adders 1366 and 1372 in conjunction with coefficient values provided from RAMs 1310–1314. More particularly, the target pixel horizontal position number ($x_t$) is provided on bus 1352 to multiplier 1356. Multiplier 1356 also receives a 20-bit coefficient ($D_n$) from look-up table RAM 1310, via bus 1354. The product $D_n x_t$ on bus 1368 is provided to one input of adder 1366. Adder 1366 receives, at its other input 1364, the product developed by multiplier 1362. Multiplier 1362, in turn, receives the target pixel vertical position number ($y_t$) on bus 1358 and a 20-bit $E_n$ coefficient from look-up table RAM 1312, via bus 1360. The expression $D_n x_t + E_n y_t$ developed by adder 1366 is provided to adder 1372 which adds a 28-bit coefficient $F_n$ retrieved from look-up table RAM 1314 and provided, via bus 1370, to adder 1372. The completed numerator expression comprising the computed value $D_n x_t + E_n y_t + F_n$ is provided to the other input of multiplier 1348 which multiplies it by the reciprocal of the denominator expression $A_n x_t + B_n y_t + C_n$ to develop a 14-bit horizontal read address signal on bus 1350.

In a similar manner, the vertical read address signal is generated from look-up table RAMs 1316–1320, multipliers 1376, 1378 and 1384, and adders 1380 and 1382. The numerator expression consisting of the expression $G_n x_t + H_n y_t + I_n$ is developed on bus 1388 and provided to one input of multiplier 1384. The other input of multiplier 1384 receives the reciprocal of the denominator expression $A_n x_t + B_n y_t + C_n$ on bus 1386 and develops a 12-bit vertical read address on bus 1390.

The ten most-significant bits of the horizontal read address and the eight most-significant bits of the vertical read address are provided to the video field memory. As previously mentioned these latter addresses are used to retrieve a 16-pixel array which is then used to generate the output or target pixel by means of interpolation of the 16 pixel values. The four least significant bits of the horizontal read address and the four least significant bits of the vertical read address are provided to the filter and interpolator circuits as fractional address values which are used to set the filter coefficients as will hereinafter be discussed.

More particularly, the 16 pixels retrieved from the video field buffer memory are transmitted to a 4×4 interpolator/filter which computes a weighted average of the 16 pixels to generate the value for a single target pixel located near the center of the 16-pixel array.

The formula used for the weighted average is:

$$P_t = (h_0 P_{00} + h_1 P_{01} + h_2 P_{02} + h_3 P_{03})v_0 + \qquad (12)$$
$$(h_0 P_{10} + h_1 P_{11} + h_2 P_{12} + h_3 P_{13})v_1 +$$
$$(h_0 P_{20} + h_1 P_{21} + h_2 P_{22} + h_3 P_{23})v_2 +$$
$$(h_0 P_{30} + h_1 P_{31} + h_2 P_{32} + h_3 P_{33})v_3$$

where the coefficients $h_0$–$h_3$ impose the desired degree of horizontal filtering and fractional pixel displacement on the target pixel and the the coefficients $v_0$–$v_3$ impose the desired degree of vertical filtering and fractional pixel displacement on the target pixel. The values of coefficients $h_0$–$h_3$ and $v_0$–$v_3$ are influenced by the:

a) the fractional portion of horizontal and vertical read addresses (four least significant bits of the horizontal read address and the four least significant bits of the vertical read address generated by the manipulator circuit;

b) the single pixel distance (0–3) that the 16 pixel array has been moved as determined by the values of horizontal read address bits X0 and X1 and vertical read address bits Y0 and Y1 which modify the read addresses in the field buffer memory and cause the outputs to be permutated; and, c) the horizontal and vertical filter bandwidth requirements.

The required horizontal and vertical filter bandwidths are determined by computing the difference between the current memory read address and the read address which was used for retrieval of the previous pixel. The difference between the current memory read address and the read address which used for retrieval of the corresponding pixel one scan line earlier is also computed. The computed differences are then compared to a set of threshold values and the largest difference is used to determine a set of filter coefficients (the larger the computed difference, the narrower the required filter bandwidth).

Figure 14:
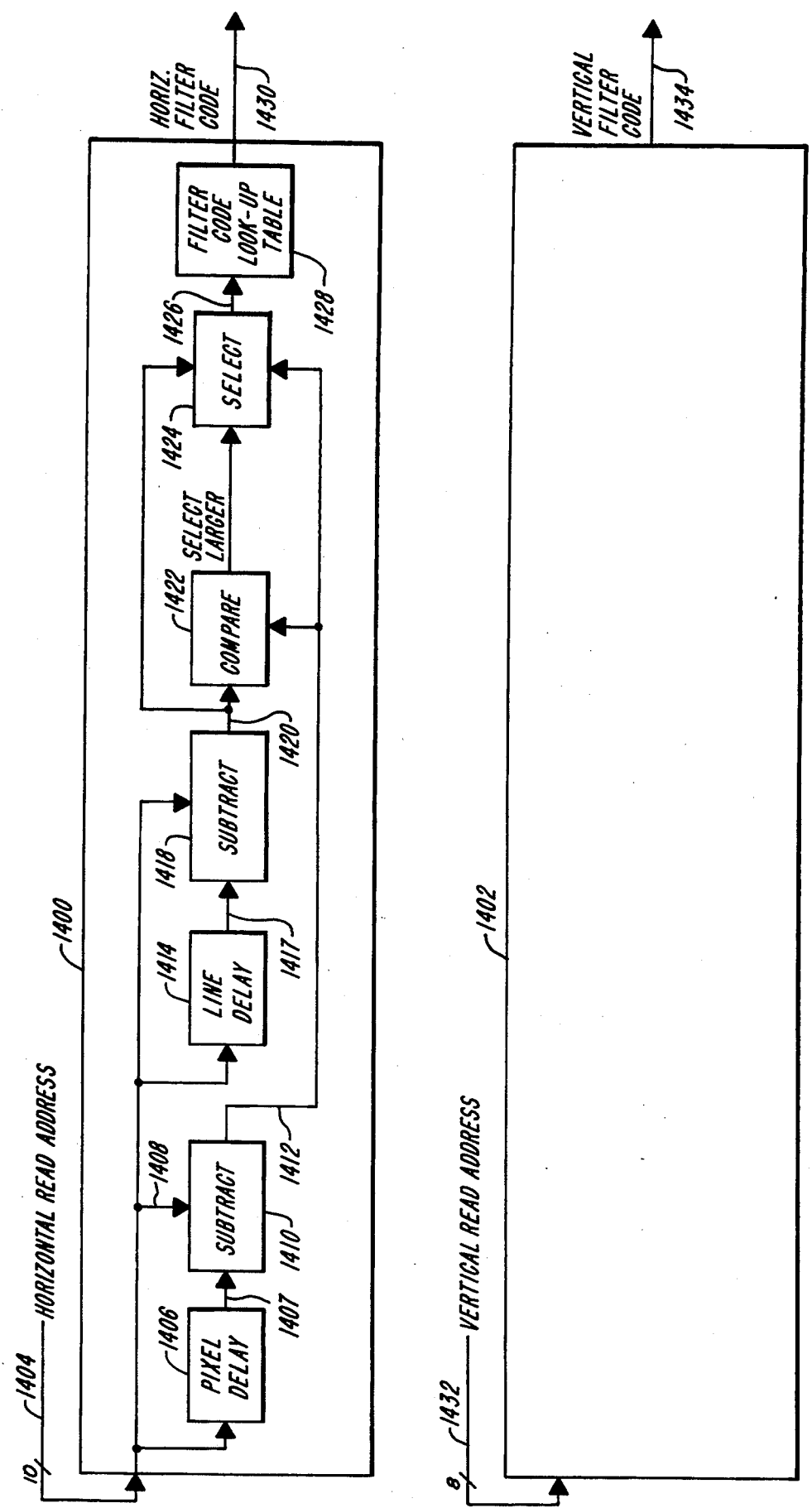
FIG. 14 is an electrical block schematic diagram of the filter coefficient generator circuit.

More particularly, the filter code calculation circuit (calcode circuit) is shown in more detail in FIG. 14. A code word, determined empirically, is derived from the measured difference comparisons. This filter code (one for horizontal and one for vertical) is then used to vary the filter coefficients to produce the required bandwidth.

The calcode circuit illustrated in FIG. 14 consists of two substantially similar circuits. Circuit 1400 receives the 10 most-significant bits of the horizontal read address on input bus 1404 and generates a horizontal filter code on output bus 1430, which code is subsequently used to select a set of horizontal filter coefficients that perform the filtering operation with the required bandwidth.

Circuit 1402 receives the eight most-significant bits of the vertical read address on input bus 1432 and generates a vertical filter code on output bus 1434. Since circuits 1400 and 1402 operate in a substantially similar manner, for clarity, only circuit 1400 will be described in detail.

More specifically, the 10 most-significant bits of the horizontal read address on input bus 1404 are provided to a pixel delay circuit 1406 which delays the address for a time period equal to one pixel duration. The delayed address on bus 1407 is provided to one input of subtraction circuit 1410. The other input of subtraction circuit 1410 is the horizontal read address on bus 1408. The difference between these two signals is provided, on bus 1412, to one input of compare circuit 1422.

In a similar manner, the horizontal read address on input bus 1404 is provided to line delay circuit 1414 which delays the address for a time period of one video scan line duration. The delayed address on bus 1417 is provided to one input of subtraction circuit 1418. The other input of subtraction circuit 1418 is the horizontal read address provided on bus 1416. The difference between the two read addresses on output bus 1420 is provided to the other input of compare circuit 1422.

Circuit 1422 compares the two address differences and generates a signal which indicates which of the address differences is larger. The address differences themselves are provided to the select inputs of a selection circuit 1424 which is controlled by the output of compare circuit 1422. Accordingly, the largest address difference on bus 1426 is provided as an address to filter code look-up table 1428. Filter code look-up table consists of a ROM which has been loaded with a plurality of filter code words. The code words are determined empirically to produce the desired filter characteristics with the computed address differences encountered during the normal operation of the circuit. The retrieved filter code is subsequently used to select filter coefficients which will produce the required filter bandwidth.

In a similar manner, the vertical circuit 1402 generates a vertical filter code used to select the vertical filter coefficients to produce the required vertical bandwidth.

The horizontal and vertical filter codes generated by the calcode circuit and the source pixel values are provided to a filter/interpolator circuit which generates the final target pixel value. A more detailed structure of the filter/interpolator shown in FIG. 15. The filter in FIG. 15 processes the luma information for the target pixels. An identical filter processes the chroma information. The interpolator consists of a plurality of interconnected hardware digital multipliers and summers which form the sum of products set forth in expression (12). In particular, the filter/interpolator circuit receives the horizontal filter code generated by the calcode circuit shown in FIG. 14 on bus 1500. The X0 and X1 address bits which indicate the modification of the horizontal read address are received from the field memory buffer on bus 1502 and the four fractional address bits on bus 1504 are received from the manipulator circuit. These inputs are combined and applied as addresses to look-up table ROMs 1506–1512 which, in response, generate the horizontal filter coefficients $h_0$–$h_3$. The filter coefficients are then multiplied by the appropriate source pixel values and the results are summed to generate the target or output pixel value.

More specifically, filter coefficient $h_0$, which is retrieved from look-up table ROM 1512, is provided, via bus 1514, to four multipliers, 1516–1521. Multiplier 1516 receives the source pixel value $P_{00}$ on bus 1518 and applies the product $h_0 P_{00}$, via bus 1520, to summer 1522.

Summer 1522 receives, at another input, the product generated by multiplier 1524 on bus 1530. Multiplier 1524 multiplies the source pixel value $P_{01}$ on bus 1526 by the filter coefficient $h_1$ retrieved from look-up table ROM 1510 and provided on bus 1528. The sum $H_0 P_{00} + h_1 P_{01}$ is provided, via bus, 1532 to summer 1538 where it is summed with product $h_2 P_{02}$ generated by multiplier 1536 and product $h_3 P_{03}$ generated by multiplier 1534. The output of summer 1538 is, in turn, applied to multiplier 1540 which receives, as its other input, the filter vertical coefficient $v_0$ generated from look-up table ROM 1562.

The vertical filter coefficients are generated by look-up table ROMs 1562–1556 which receive, as their address inputs, a vertical filter code on bus 1550 generated by the calcode circuit shown in FIG. 14; the Y0 and Y1 address bits from the field buffer memory circuit; and the fractional vertical read address bits from bus 1554 from the manipulator circuit. Filter coefficients $v_0$–$v_3$ retrieved from look-up table ROMs 1562–1556 are applied to multipliers 1540–1545 in order to generate the final subtotals. The outputs of multipliers 1540 and 1541 are summed in summer 1542 and the result on bus 1544 is summed with the products generated by multipliers 1543 and 1545. The final output on bus 1546 comprises the value of the target pixel for the target pixel location $x_t$, $y_t$.

A similar process is carried out for each of the target pixels in the video display field resulting in a stream of output luma pixels on bus 1546. A similar filter/interpolator generates a stream of chroma pixels from the chroma portion of the video field buffer memory.

Figure 16:
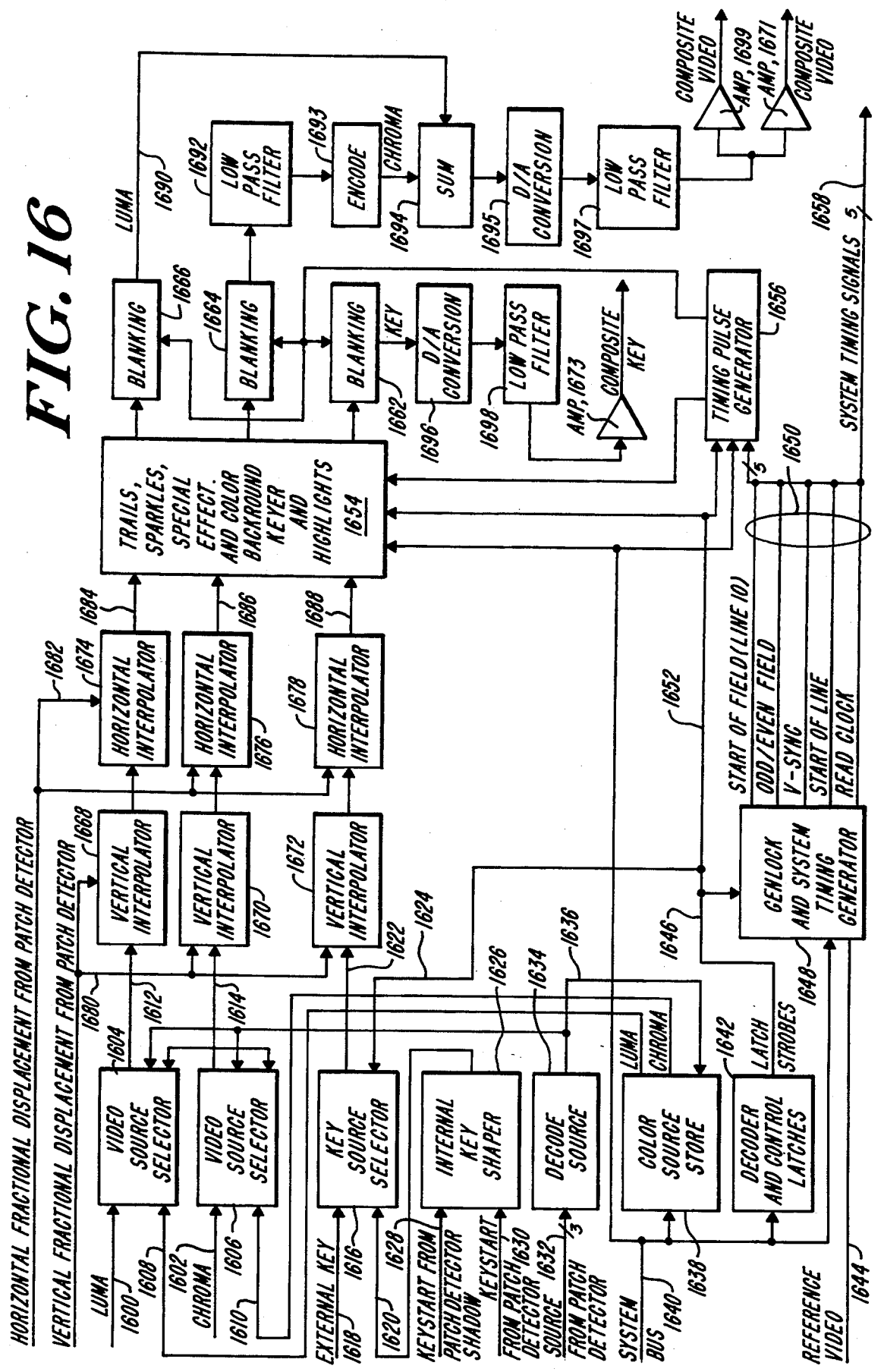
FIG. 16 is an electrical block schematic diagram of an output video processor circuit which processes the transformed digital information to generate output analog video information.

The output luma and chroma pixel streams are applied to output video processor circuitry which further processes the signals, combines the luma and chroma information and finally converts the digitized information into a composite video signal. A functional block diagram of the output video processor circuitry is shown in FIG. 16.

Figure 15:
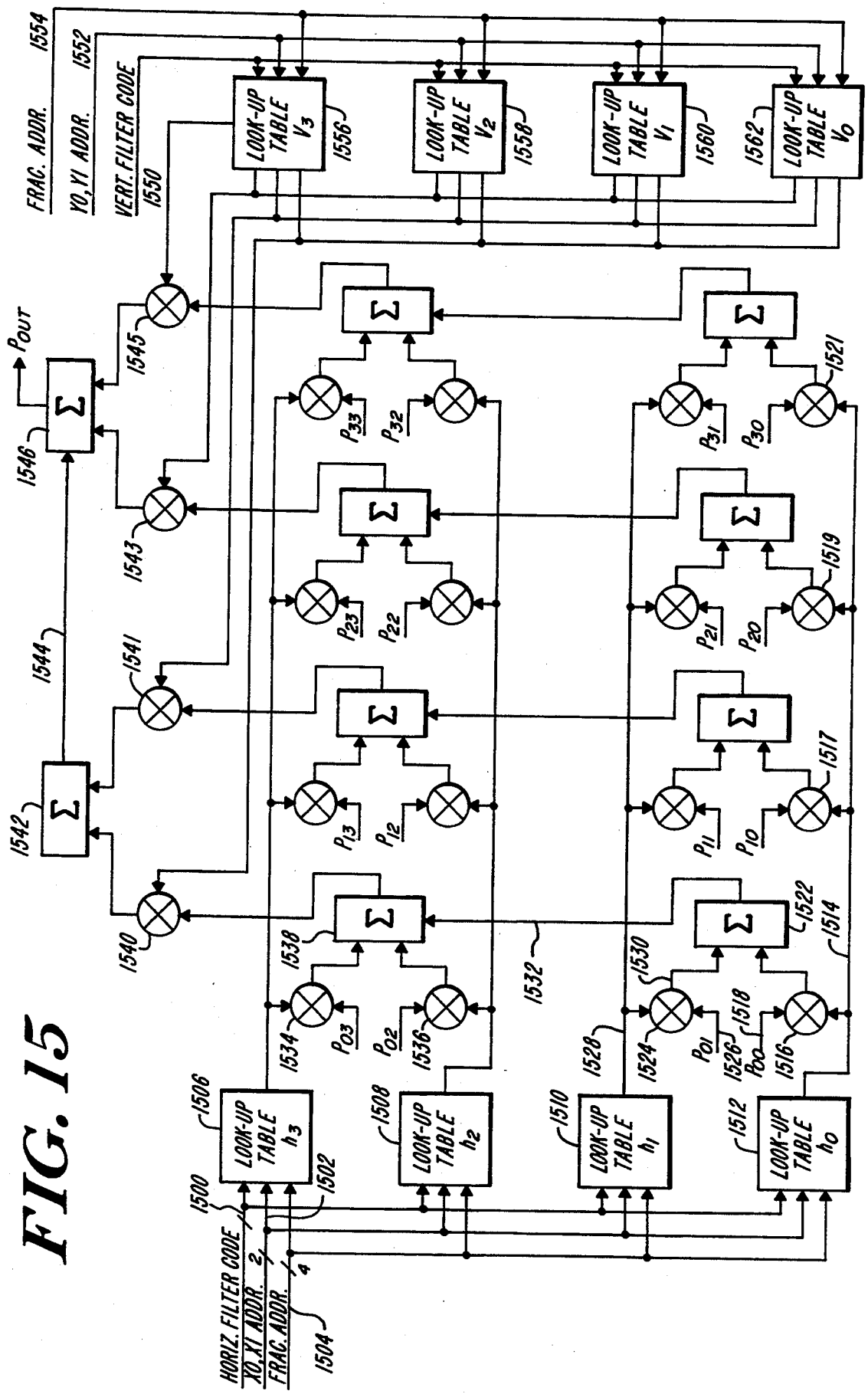
FIG. 15 is an electrical block schematic diagram of an illustrative four-by-four interpolator circuit.

More particularly, the target pixel luma information is provided from the filter/interpolator circuit shown in FIG. 15, via bus 1600, to video source selector 1604. In a similar manner, the target pixel chroma information is provided from the filter/interpolator circuit, via bus 1602, to video source selector 1606. Video source selectors 1604 and 1606 also receive, as additional inputs, via buses 1608 and 1610, luma and chroma information from a color source store 1638 which can be loaded with colored background information from system bus 1640. Selectors 1604 and 1606 can select either the target pixel information or the color source background information from store 1638 under control of decoder 1634 which receives the video source information from the patch detector, via bus 1632.

An independent key signal is also processed through the output video processor. This key signal may selectively be an external key signal or an internal key signal. An external key signal on bus 1618 is provided to key source selector 1616 which can choose between the external key on bus 1618 and an internal key generated on bus 1620 by key shaper 1626. Key shaper 1626, in turn, receives the single-bit key and the shadow signals from the patch detector over buses 1628 and 1630. If a single-bit key signal is received, it is used to access a ROM memory to generate an eight-bit key signal which can then be interpolated. The key shaper also performs horizontal and vertical filtering to produce pulse rise times which do not cause ringing. Key selector 1616 selects either the internal or external key information under control of signals generated at the user's control panel. The key selection information is forwarded to the output video processor via system bus 1640 and latched into decoder and latch circuit 1642. The latched information then controls key selector 1616 via buses 1646 and 1624.

The outputs of source selectors 1604, 1606 and 1616 on buses 1612, 1614 and 1622 are provided to a set of vertical and horizontal interpolators which selectively perform additional edge interpolation based on the fractional displacement information generated by the patch detector as previously described. This additional interpolation is necessary in cases where there is change from one video source to another over a patch boundary, or a patch has been "flipped" in orientation resulting in a video discontinuity at the patch boundary. This discontinuity cannot be accommodated by the interpolation process carried out by the aforementioned filter/interpolator because that filter operates only on a 16-pixel array in one video buffer memory. Consequently, there is no "inter-buffer" interpolation in the filter/interpolator circuit.

In particular, the luma, chroma and key information is first subject to vertical interpolation by interpolators 1668, 1670 and 1672 under control of the vertical fractional displacement provided from the patch detector on bus 1680. In a similar manner, the output of vertical interpolators 1668–1672 is provided to horizontal interpolators 1674–1678 which provide horizontal interpolation under control of the horizontal fractional displacement generated by the patch detector on bus 1682.

Figure 20:
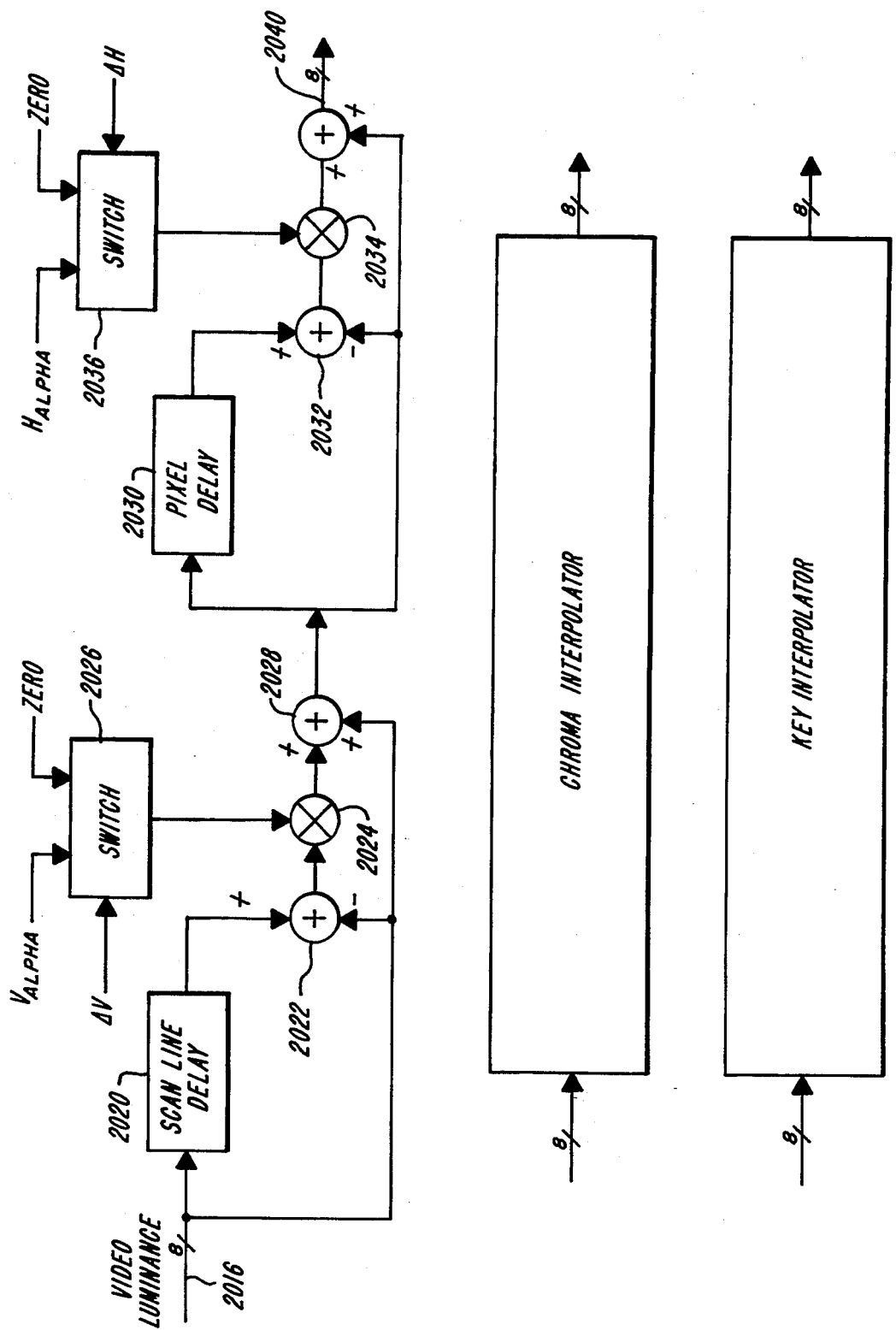
FIG. 20 is a detailed electrical block schematic diagram of the horizontal and vertical fractional interpolators used in the output video processor circuit.

The vertical and horizontal interpolators are shown in more detail in FIG. 20. As the interpolators for the luminance, chrominance and key information are identical only the luminance interpolator is shown in detail for clarity. The luminance interpolator receives eight-bit luminance information from the video source selector on input bus 2016. The interpolator also receives the vertical fractional displacement, V alpha, the horizontal fractional displacement H alpha and the $\Delta V$ and $\Delta H$ signals from the patch detector as previously described. These signals are applied to a two-point vertical interpolator and a two-point horizontal interpolator. The interpolators perform the function $$a(D-P)+P \qquad (13)$$

where a is the fractional displacement required, P is the present video pixel and D is a video pixel delayed by one scan line for vertical interpolation or by one pixel delay for horizontal interpolation. More particularly, the luminance information on bus 2016 is applied to a scan line delay circuit 2020. The delayed output of circuit 2020 is applied to one input of subtractor 2022. Subtractor 2022 subtracts the un-delayed input on bus 2016 from the delayed signal. The difference is multiplied by a selected number by multiplier 2024. The number applied to multiplier 2024 which multiplies the difference is controlled by switch 2026. Switch 2026 is, in turn controlled by the $\Delta V$ signal generated by the patch detector as previously described. If the $\Delta V$ signal is "high", indicating that a vertical boundary has been crossed, then switch 2026 is activated to apply the V alpha fractional displacement signal to multiplier 2024.

Alternatively, if the V alpha signal is "low" indicating that no vertical boundary was crossed, then a "zero" is applied to multiplier 2024 causing no vertical interpolation to take place. The output of multiplier 2024 is summed with the original input in summer 2028 to generate the vertically-interpolated signal.

The interpolated signal is applied to pixel delay 2030 for horizontal interpolation. The delayed output of circuit 2020 is applied to one input of subtractor 2032. Subtractor 2032 subtracts the un-delayed input from summer 2028 from the delayed signal. The difference is multiplied by a selected number by multiplier 2034. The number applied to multiplier 2034 which multiplies the difference is controlled by switch 2036. Switch 2036 is, in turn controlled by the ΔH signal generated by the patch detector as previously described. If the ΔH signal is "high", indicating that a horizontal boundary has been crossed, then switch 2036 is activated to apply the H alpha fractional displacement signal to multiplier 2034. Alternatively, if the H alpha signal is "low" indicating that no horizontal boundary was crossed, then a "zero" is applied to multiplier 2034 causing no horizontal interpolation to take place. The output of multiplier 2034 is summed with the original input in summer 2038 to generate the vertically and horizontally interpolated signal on bus 2040.

The interpolated luma, chroma and key information on buses 1684–1688, respectively, is provided to a special effects generator circuit 1654 which generates selected video special effects such as trails and sparkles and generates a color background key in a conventional manner. Unit 1654 operates under control of a latch signal on bus 1652 (generated by decoder and control latch circuit 1642), data received from the system computer via system data bus 1640 and timing information provided by timing pulse generator 1656 and also acts as a linear mixing circuit which places a colored background on the video in order to erase any unwanted artifacts from the transformation process.

After the special effects have been added by circuit 1654, the luma, chroma and key information is provided to blanking circuits 1666–1662 which insert blanking signals in a conventional manner under control of timing signals on lead 1660 generated by timing pulse generator 1656. Sync pulses and, for video signals, burst signals are added in a conventional fashion at this stage.

The processed luma information on bus 1690 is provided to summer 1694. Summer 1694 also receives processed chroma information which has been filtered by low-pass filter 1692 and re-encoded by encoder 1693 in a conventional manner. The output of summer 1694 is digital composite video which is converted into an analog signal by D/A converter 1695 and low-pass filter 1697. The composite video is output by video amplifiers 1699 and 1671.

In a similar manner, the blanked key signal on bus 1691 is converted into an analog signal by D/A converter 1696 and low-pass filter 1698 and provided as a composite key signal output via amplifier 1673.

System timing and genlock are provided by timing generator 1648 which processes a reference video signal to derive timing information. Reference video on lead 1644 is processed in circuit 1648 in a conventional fashion to isolate the sync and burst signals. A phase-locked-loop arrangement in circuit 1648 is used to generate a pixel clock whose phase tracks the burst on the reference video signal. Additional conventional circuits generate timing pulses, which represent the the start of a picture field, the start of each scan line and the phase of the color burst signal. These signals are used in the video field buffer, patch detector and manipulator circuits to synchronize the processing of the digital information.

FIG. 17 shows a timing chart of the special effects system illustrating the "pipeline" effect of the processing system. This diagram indicates, for seven separate video field times, the functions performed by various parts of the system during each field. During the normal operation of the system, pixel information corresponding to four separate fields is being processed simultaneously. FIG. 17 shows the system in a "startup mode" in which information begins to arrive at the system and slowly fills the "pipeline" of the processor.

More particularly, during the first video field (arbitrary designated as field no. "N"), the system computer computes and stores parameters for a video field arbitrary labelled as picture, "PIX", A.

During the next video field (field N+1), the system computer sends the input source-to-patch assignment data to the input video processor utilizing the parameters computed in the previous field (field N). At the same time, the system computer computes and stores parameters for the next picture field (PIX B).

During the next subsequent video field (field N+2), the system computer sends line coefficients, patch numbers, orientations, patch priorities, and source switching parameters to the patch detector for the picture A (PIX A). In addition, the inverse or target-to-source transformation matrix coefficients and patch numbers are provided to the manipulator circuit for picture A. At the same time, the input video processor is sending the source pixel information to the field buffer memory for storage in accordance with the source-to-patch assignment data received from the system computer in video field N+1. The source pixel information forwarded by the input video processor to the video field buffer memory is written into the memory during field N+2.

During the next video field (field N+3), the patch detector determines a patch number for each of the target pixels and sends the patch numbers to the manipulator. The patch detector also determines the keystart and video switching information and forwards the latter information to the output video processor. During that same field (N+3), the manipulator circuit utilizes the patch numbers determined by the patch detector and computes field memory read addresses for each target pixel. These memory addresses are applied to the video field buffer memory which reads the source pixel information stored in the previous (field N+2) video field.

During the same video field (field N+3), the calcode circuit computes the filter codes necessary for the interpolation and the filter/interpolator circuit utilizes the information read from the video field buffer memory to generate the target pixel values. Also during the same video field (N+3), the output video processor switches the data sources to generate the complete picture and interpolates any key signals as necessary to generate the composite output key.

At each video field except for the first video field, the processing system is simultaneously processing pixel information from two or more separate video field pictures so that by the fourth video field, the system is simultaneously processing pixel information from four separate video pictures. This pipeline arrangement allows the video processor to process video effects information with only a three-field delay. The actual video delay through the system is one frame.

Although only one illustrative embodiment of the invention has been shown, other changes and modifications will immediately become obvious to those skilled in the art which changes in modifications are intended to be covered by the following claims.

What is claimed is:

1. A video 3D special-effects system for manipulating a stream of source pixel values representing a digitized flat video source image to create an output display comprising a plurality of target pixels, each of which has a target location and value, that form a projection into a viewing plane of a desired three-dimensional object formed by a plurality of object polygons on each of which appears a segment of the source image contained in a different respective source polygon associated therewith such that each target point that is a projection into the image plane of a point in the object polygon thereby corresponds to a source point in the source polygon associated with that object polygon and each source polygon is associated with the polygon, denominated a target polygon, formed by the target points corresponding to the source points in that source polygon, the system comprising:

A) means controlled by the user for specifying, for each of a plurality of the source polygons, a transform associated therewith for determining from the location of a target point in the associated target polygon the location of the corresponding source point in the associated source polygon and for specifying boundary coefficients that define the boundaries of the associated target polygon;

B) means for generating a target-pixel-location signal that consecutively identifies each of the plurality of target pixels in the output display;

C) a plurality of separate patch detectors, each of which is associated with a different one of the target polygons and thereby with the boundary coefficients specified therefor, each patch detector being responsive to reception of the target-pixel-location signal simultaneously with its reception by other patch detectors to determine simultaneously therewith whether the target pixel identified by the target-pixel-location signal is located in the target polygon defined by the boundary coefficients associated with that patch detector and to generate a presence signal indicative of the result of that determination;

D) means responsive to the presence signals for selecting, in accordance with predetermined criteria, one said target polygon in which the given target pixel is located;

E) means responsive to the target-pixel location signal and the polygon selection for employing the transform associated with the selected polygon to calculate the source location corresponding to the target pixel identified by the target-pixel location signal; and F) means for calculating a value, for each target pixel located in a target polygon, from at least one source value chosen in accordance with the source location calculated for that target pixel and for generating an output display signal representing an output display that comprises pixels having values thus calculated.

2. A video 3D special effects system according to claim 1 wherein said selecting means comprises means for assigning a priority code to each of said plurality of polygons and means responsive to said priority code and operative, when more than one of said presence signals identifies their respective target polygons as containing the target pixel identified by the target-pixel-location signal, for selecting one of said identified polygons.

3. A video 3D special-effects system according to claim 1 wherein said means for calculating a value for each target pixel located in a target polygon generators said value for each such target pixel by filtering an interpolation of source pixel values in response to said source location.

4. A video 3D special-effects system for manipulating first analog video picture information representing a flat video source image to create an output display comprising a plurality of target pixels, each of which has a target location and value, that form a projection into a viewing plane of a desired three-dimensional object formed by a plurality of object polygons on each of which appears a segment of the source image contained in a different respective source polygon associated therewith such that each target point that is a projection into the image plane of a point in the object polygon thereby corresponds to a source point in the source polygon associated with that object polygon and each source polygon is associated with the polygon, denominated a target polygon, formed by the target points corresponding to the source points in that source polygon, the system comprising:

A) an analog-to-digital converter responsive to said analog picture information for generating a stream of digital source pixel values;

B) a memory responsive to said stream of digital source pixel values for temporarily storing said digital source pixel values;

C) means controlled by the user for specifying, for each of a plurality of the source polygons, a transform associated therewith for determining from the location of a target point in the associated target polygon the location of the corresponding source point in the associated source polygon and for specifying boundary coefficients that define the boundaries of the associated target polygon;

D) means for generating a target-pixel-location signal that consecutively identifies each of the plurality of target pixels in the output display;

E) a plurality of separate patch detectors, each of which is associated with a different one of the target polygons and thereby with the boundary coefficients specified therefor, each patch detector being responsive to reception of the target-pixel-location signal simultaneously with its reception by other patch detectors to determine simultaneously therewith whether the target pixel identified by the target-pixel-location signal is located in the target polygon defined by the boundary coefficients associated with that patch detector and to generate a presence signal indicative of the result of that determination;

F) means responsive to the presence signals for selecting, in accordance with predetermined criteria, one said target polygon in which the given target pixel is located;

G) means responsive to the target-pixel location signal and the polygon selection for employing the transform associated with the selected polygon to calculate the source location corresponding to the target pixel identified by the target-pixel location signal;

H) means responsive to the calculated source location for retrieving from the memory at least one source value; and I) means for calculating, for each target pixel located in a target polygon, a value calculated from that at least one source value retrieved from the memory and for generating an output display signal representing an output display that comprises pixels having values thus calculated.

5. A video 3D special effects system according to claim 4 wherein said selecting means comprises means for assigning a priority code to each of said plurality of polygons and means responsive to said priority code and operative, when more than one of said presence signals identifies their respective target polygons as containing the target pixel identified by the target-pixel-location signal, for selecting one of said identified polygons.

6. A video 3D special effects system according to claim 4 wherein said means for calculating a value for said each of said target pixels located in a target polygon calculates said value for each such target pixel by filtering and interpolation of source pixel values in response to said at least one retrieved source pixel value.

7. A video 3D special effects system according to claim 4 wherein said means for generating a target-pixel location signal comprises a scan line counter and a pixel position counter.

8. A video 3D special effects system according to claim 4 further comprising means responsive to said output display signal for generating an analog output video display representing an image of said desired three-dimensional shape.

9. A video 3D special effects system according to claim 4 further comprising means responsive to said first analog video picture information and to second analog video picture information for selectively applying said first analog video picture information and second analog video picture information to said analog-to-digital converter.

10. A method for manipulating a stream of source pixel values representing a digitized flat video source image to create an output display comprising a plurality of target pixels, each of which has a target location and value, that form a projection into a viewing plane of a desired three-dimensional object formed by a plurality of object polygons on each of which appears a segment of the source image contained in a different respective source polygon associated therewith such that each target point that is a projection into the image plane of a point in the object polygon thereby corresponds to a source point in the source polygon associated with that object polygon and each source polygon is associated with the polygon, denominated a target polygon, formed by the target points corresponding to the source points in that source polygon, the method comprising:

A) specifying, for each of a plurality of the source polygons, a transform associated therewith for determining from the location of a target point in the associated target polygon the location of the corresponding source point in the associated source polygon and for specifying boundary coefficients that define the boundaries of the associated target polygon;

B) generating a target-pixel-location signal that consecutively identifies each of the plurality of target pixels in the output display;

C) determining, separately and simultaneously for each of a plurality of target polygons, whether the target pixel identified by the target-pixel-location signal is located in the target polygon defined by the boundary coefficients associated with that target polygon and generating for each such target polygon a presence signal indicative of the results of that determination;

D) selecting, in response to the presence signals and in accordance with predetermined criteria, one said target polygon in which the given target pixel is located;

E) responding to the target-pixel location signal and the polygon selection by employing the transform associated with the selected polygon to calculate the source location corresponding to the target pixel identified by the target-pixel location signal; and F) calculating, for each target pixel located in a target polygon, a value calculated from at least one source value chosen in accordance with the source location calculated for that target pixel and for generating an output display signal representing an output display that comprises pixels having values thus calculated.

11. A method for manipulating a stream of source video pixel values according to claim 10 wherein step B comprises the steps of:

B1. sequentially selecting each target pixel from left to right on a particular video scan line;

B2. sequentially selecting each target pixel from left to right on a subsequent video scan line after all pixels on a scan line have been selected in step B1; and B3. repeating steps B1 and B2 until all target pixels have been selected.

12. A method for manipulating a stream of source video pixels according to claim 10 wherein step D further comprises the steps of:

D1. assigning a priority code to each of said plurality of target polygons; and

D2. using an assigned priority code to select a single target polygon when more than one of said presence signals identifies their respective target polygons as containing the target pixel identified by the target-pixel-location signal.

* * * * *